United States Patent
Oberste et al.

(10) Patent No.: US 11,473,223 B2
(45) Date of Patent: Oct. 18, 2022

(54) SYSTEMS AND METHODS FOR CONTINUOUS FABRICATION OF WOVEN COMPOSITE MATERIALS

(71) Applicant: Georgia Tech Research Corporation, Atlanta, GA (US)

(72) Inventors: Christopher Marc Oberste, Atlanta, GA (US); Phillip Sung Tse Cheng, Atlanta, GA (US); Ben Wang, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 857 days.

(21) Appl. No.: 16/301,883

(22) PCT Filed: May 15, 2017

(86) PCT No.: PCT/US2017/032703
§ 371 (c)(1),
(2) Date: Nov. 15, 2018

(87) PCT Pub. No.: WO2017/200935
PCT Pub. Date: Nov. 23, 2017

(65) Prior Publication Data
US 2019/0284731 A1    Sep. 19, 2019

Related U.S. Application Data

(60) Provisional application No. 62/336,974, filed on May 16, 2016.

(51) Int. Cl.
*D03C 3/20* (2006.01)
*D03D 41/00* (2006.01)
(Continued)

(52) U.S. Cl.
CPC .............. *D03C 3/205* (2013.01); *D03C 13/02* (2013.01); *D03D 41/004* (2013.01); *D03D 47/266* (2013.01)

(58) Field of Classification Search
CPC ...... D03C 3/205; D03C 13/02; D03D 47/266; D03D 15/00; D03D 15/225; D03D 15/283; D03D 15/292; D03D 41/004; D03J 1/06
See application file for complete search history.

(56) References Cited

U.S. PATENT DOCUMENTS 3,634,827 A *  1/1972  Lourie ................... H01B 7/083
                                                      700/131
3,881,522 A    5/1975  Albert et al.
(Continued)

FOREIGN PATENT DOCUMENTS

CN      101831744       9/2010
DE     102012101016    8/2013
(Continued)

OTHER PUBLICATIONS

Office Action from related Japanese application (w/machine English translation) dated Apr. 15, 2021.
(Continued)

*Primary Examiner* — Katharine G Kane
(74) *Attorney, Agent, or Firm* — Troutman Pepper Hamilton Sanders LLP; Ryan A. Schneider

(57) ABSTRACT

A machine and method are presented for continuously forming a woven composite with controllable internal fabric geometry. The machine may include one or more spools for dispensing one or more warp filaments, a roller assembly configured to receive a composite weave, a warp rack having a plurality of warp heads for engaging the warp filaments and vertically adjusting position to dynamically create a
(Continued)

weave pattern in response to the insertion of one or more weft filaments by a weft inserter stack.

25 Claims, 17 Drawing Sheets

(51) Int. Cl.
    *D03C 13/00*     (2006.01)
    *D03D 47/26*     (2006.01)

(56) References Cited

U.S. PATENT DOCUMENTS

| | | | | |
|---|---|---|---|---|
| 3,960,182 | A * | 6/1976 | Schwarz | D03C 9/02 139/91 |
| 4,080,915 | A * | 3/1978 | Bompard | B29C 70/24 112/412 |
| 4,195,671 | A * | 4/1980 | Bossut | D03C 3/00 139/455 |
| 4,871,491 | A * | 10/1989 | McMahon | A63B 51/02 264/29.2 |
| 5,775,381 | A * | 7/1998 | Addis | D03D 41/004 139/11 |
| 5,783,278 | A * | 7/1998 | Nishimura | D03D 49/16 428/102 |
| 6,733,211 | B1 * | 5/2004 | Durie | D03D 11/00 139/383 R |
| 9,725,832 | B1 * | 8/2017 | Ouellette | D03C 9/02 |
| 2001/0039975 | A1 * | 11/2001 | Braun | D03C 3/205 139/59 |
| 2007/0293976 | A1 * | 12/2007 | Puget | D03C 3/205 700/140 |
| 2008/0092978 | A1 * | 4/2008 | Beernaert | D03C 9/0625 139/68 |
| 2010/0129597 | A1 * | 5/2010 | Hansen | D03D 11/00 428/107 |
| 2010/0269948 | A1 * | 10/2010 | Legrand | D03D 25/005 139/384 R |
| 2010/0307629 | A1 * | 12/2010 | Citterio | D03D 15/00 139/116.1 |
| 2011/0265905 | A1 * | 11/2011 | Kuhl | D03D 25/005 139/11 |
| 2014/0186600 | A1 * | 7/2014 | Dyksterhouse | D03D 15/587 428/220 |
| 2015/0114511 | A1 * | 4/2015 | Dambrine | D03D 41/00 139/86 |
| 2015/0167208 | A1 * | 6/2015 | Bischoff | B29C 70/22 442/59 |
| 2015/0233028 | A1 * | 8/2015 | Tomiyori | D03D 1/00 139/413 |
| 2016/0305051 | A1 * | 10/2016 | Oberste | B29C 70/24 |
| 2017/0198424 | A1 * | 7/2017 | Alex | D03D 31/00 |
| 2018/0216262 | A1 * | 8/2018 | Rutz | D03C 9/024 |
| 2018/0223456 | A1 * | 8/2018 | Mathon | D03C 3/24 |
| 2019/0062959 | A1 * | 2/2019 | Lewis | D03D 3/04 |
| 2019/0161891 | A1 * | 5/2019 | Estreicher | D03D 15/52 |

FOREIGN PATENT DOCUMENTS

| | | |
|---|---|---|
| DE | 102014112468 | 12/2015 |
| JP | 2001-355154 | 12/2001 |
| JP | 2003-136550 | 5/2003 |
| JP | 2006-519322 | 8/2006 |
| JP | 2006-233341 | 9/2006 |
| WO | 2013179037 | 12/2013 |

OTHER PUBLICATIONS

Supplemental Search Report from EP Application No. 17799954 dated Jan. 13, 2020.
International Search Report and Written Opinion from application No. PCT/US2017/032703 dated Jul. 27, 2017 (14 pages).
Office Action from Korean application 10-2018-7035541 (w/machine English translation) dated Aug. 17, 2021.

* cited by examiner

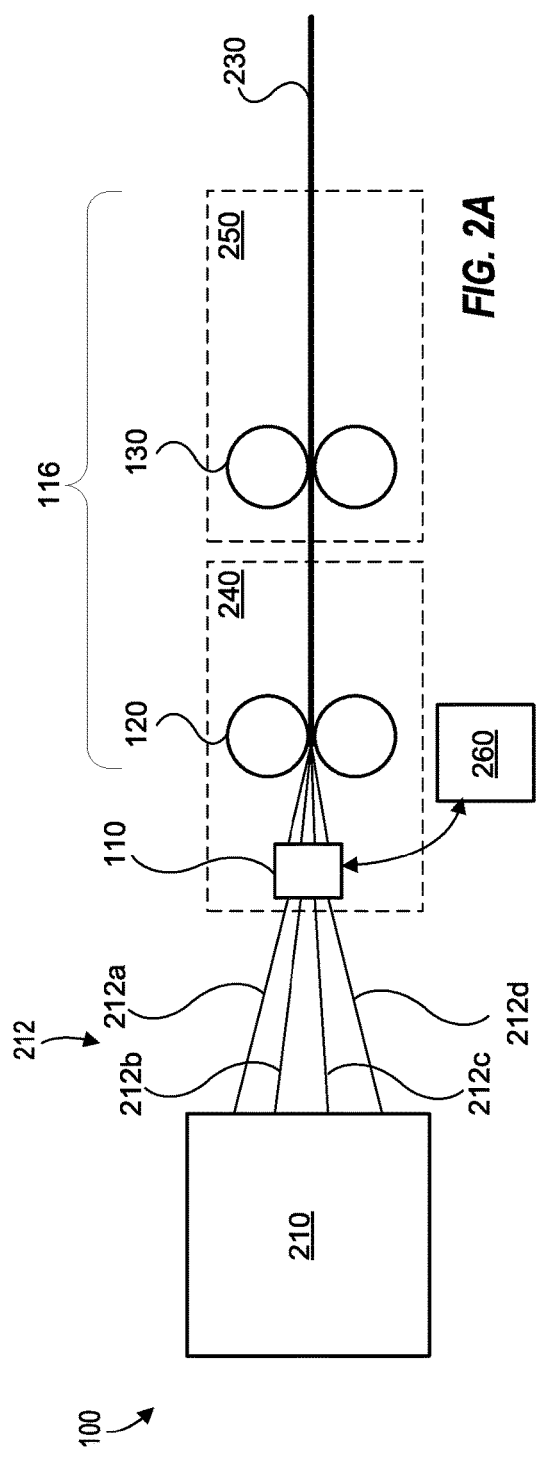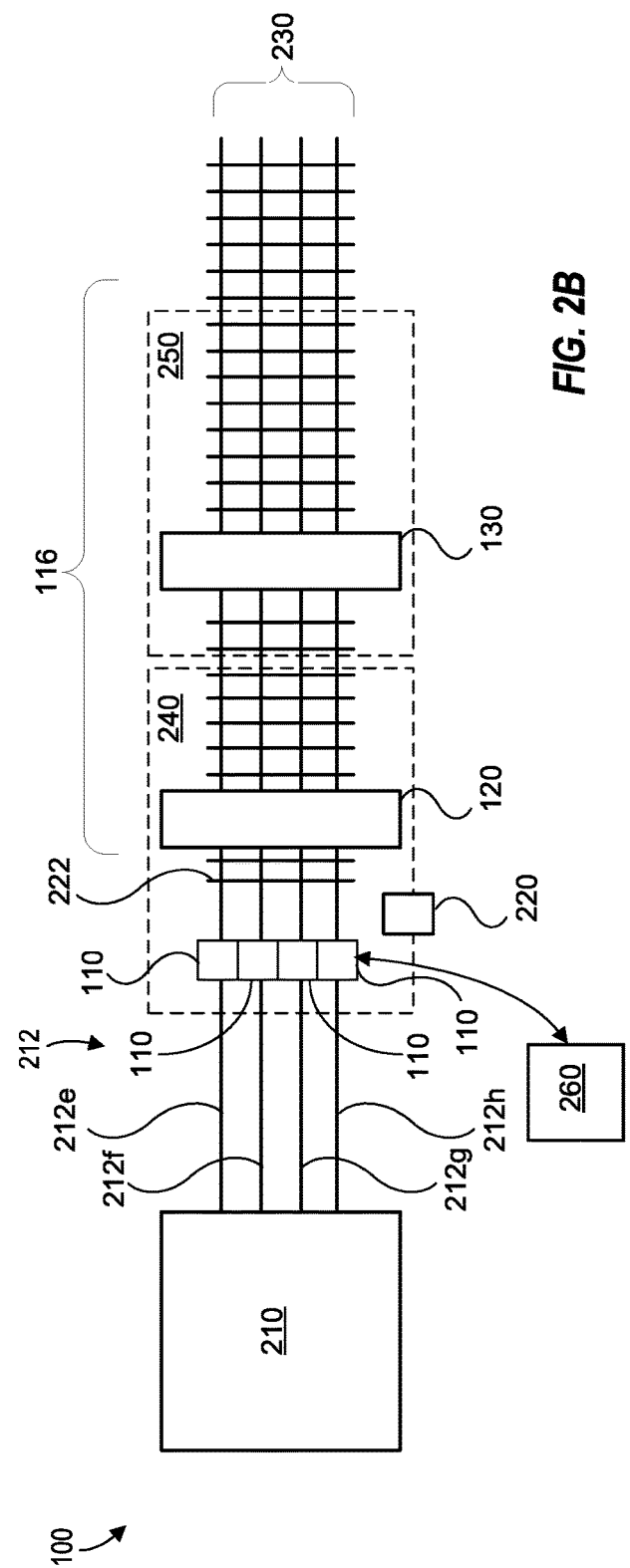

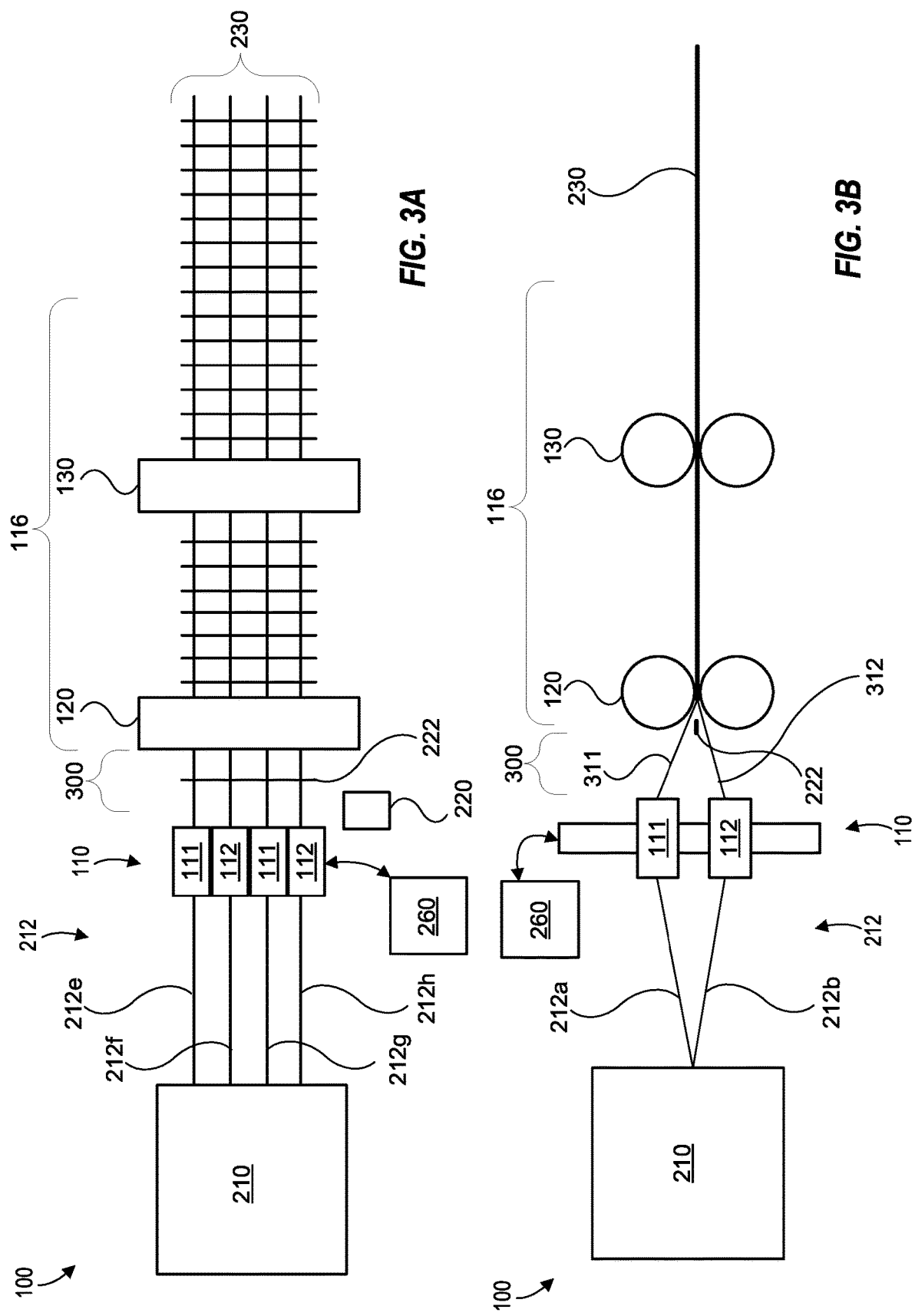

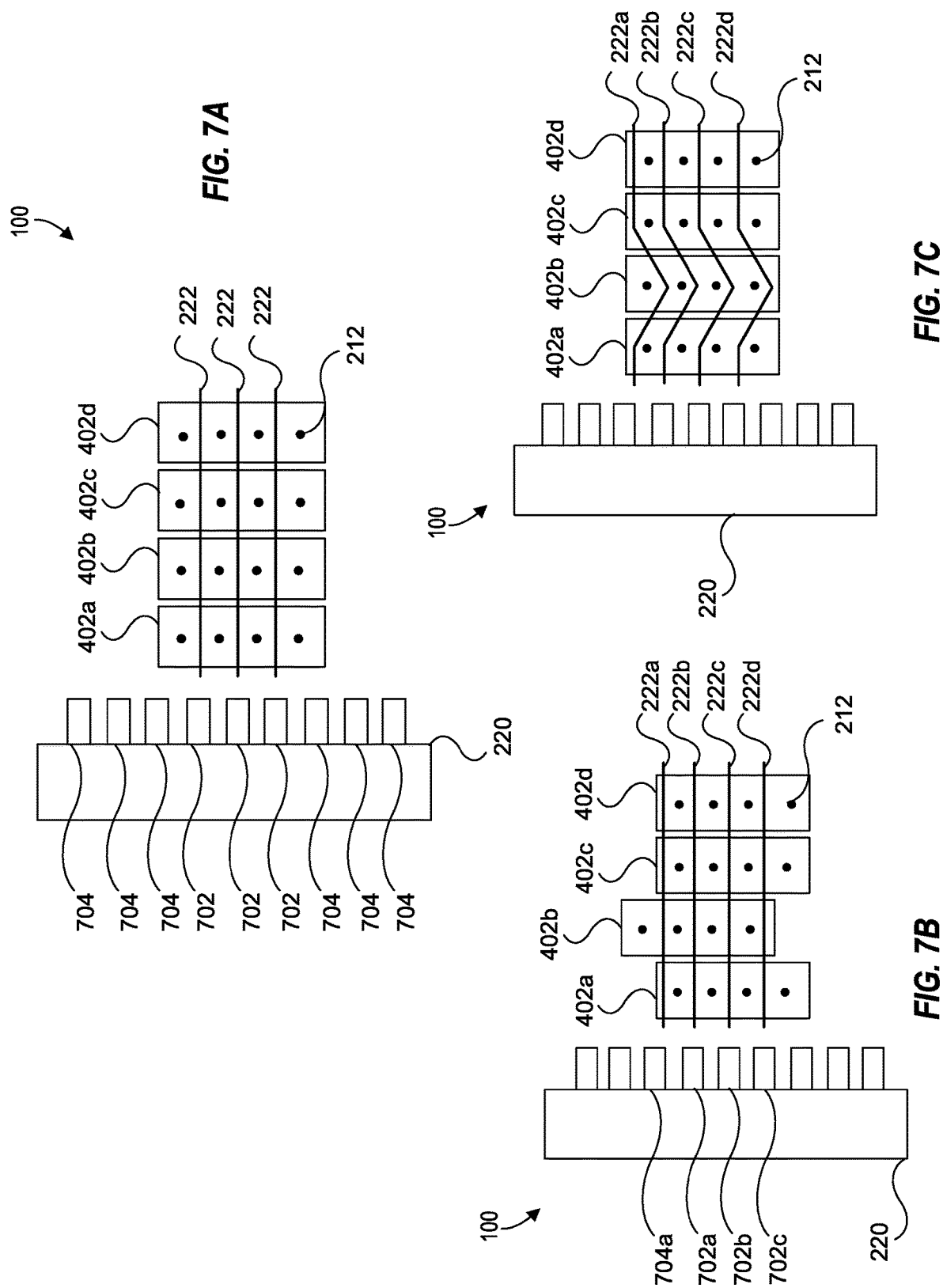

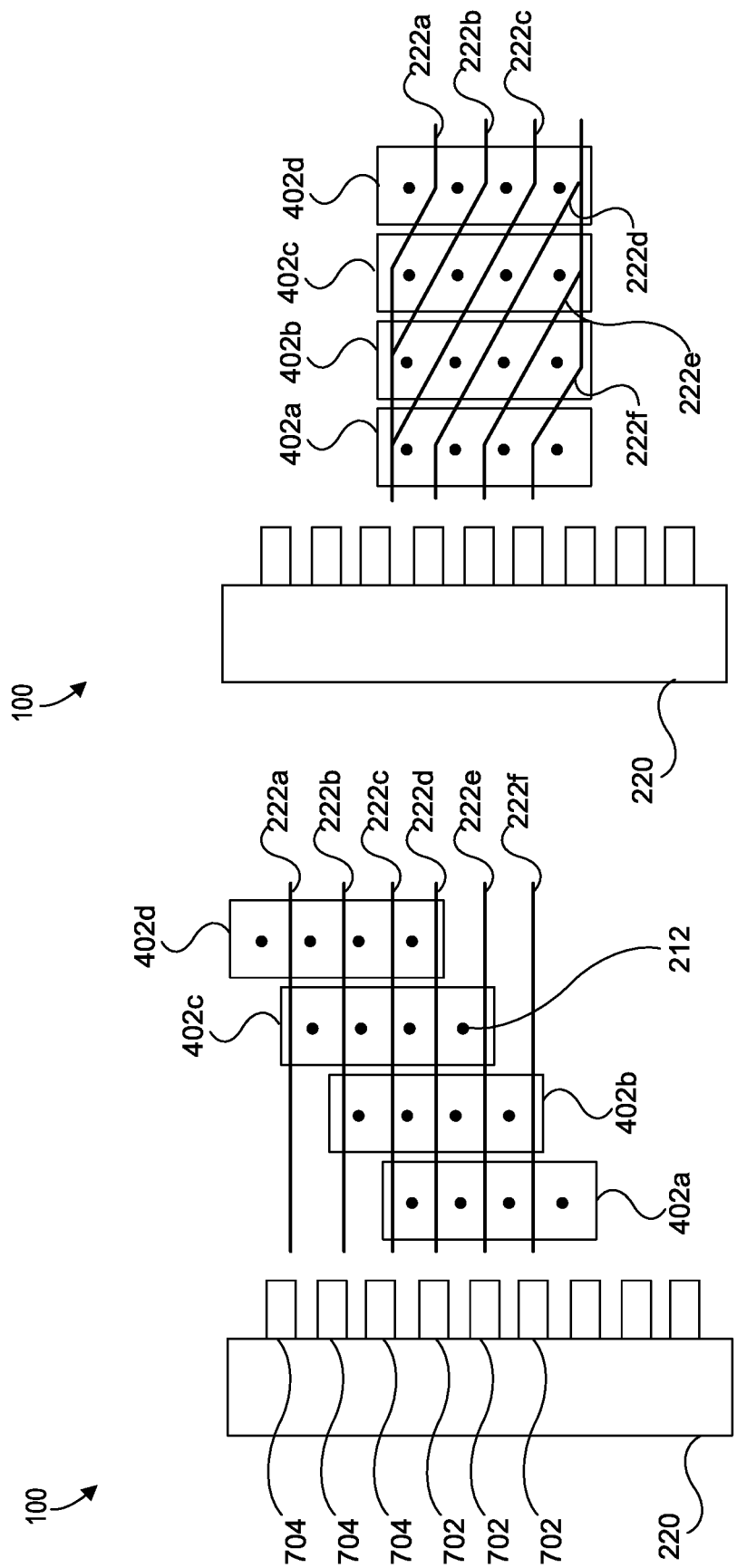

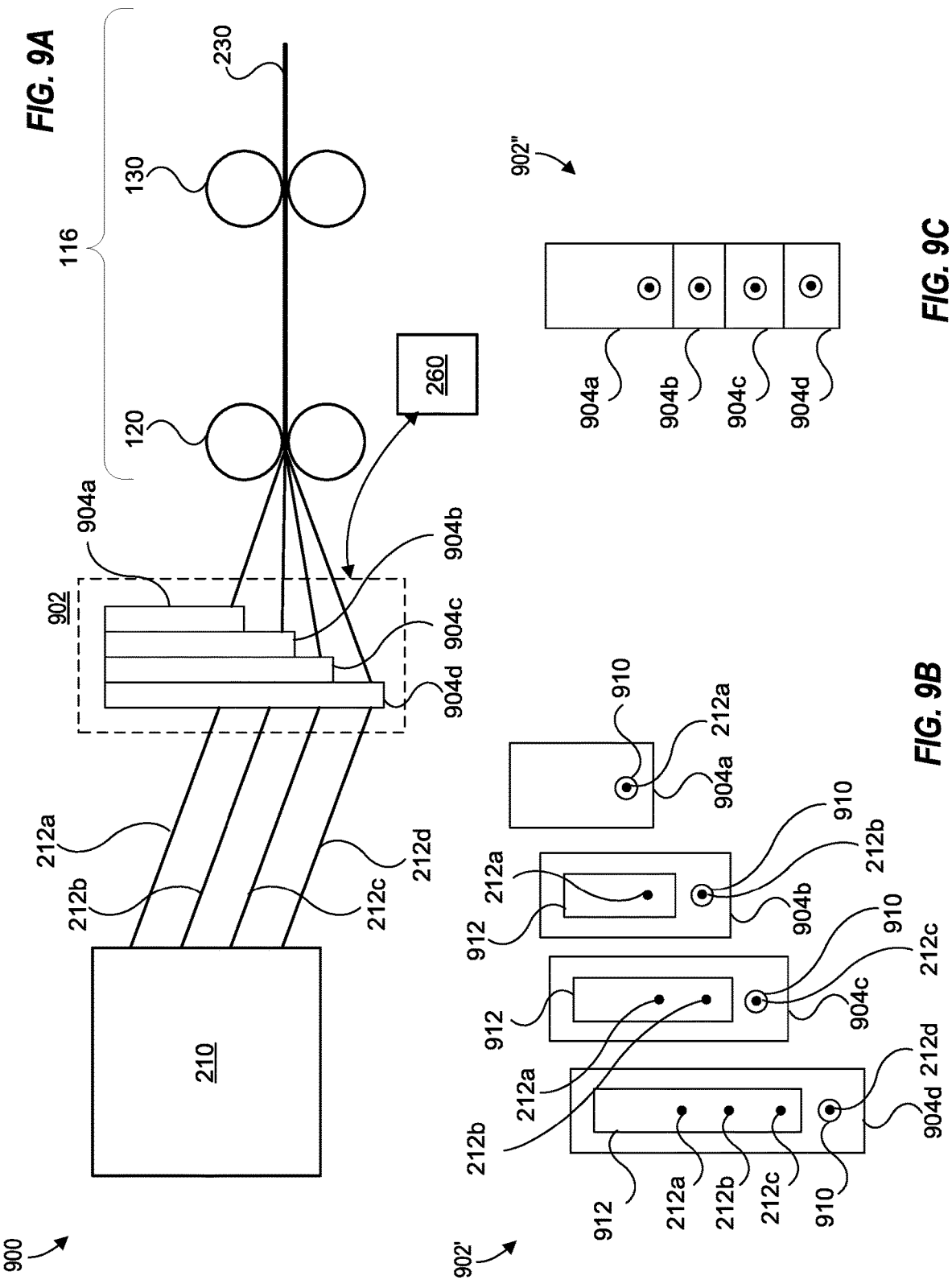

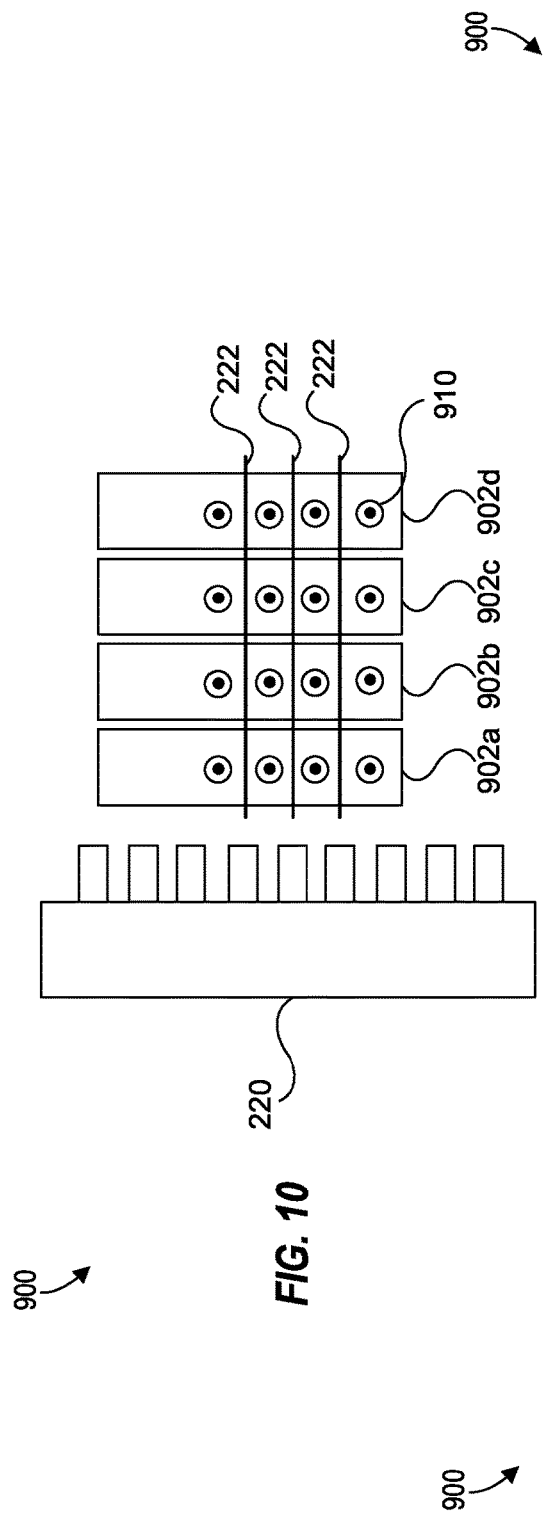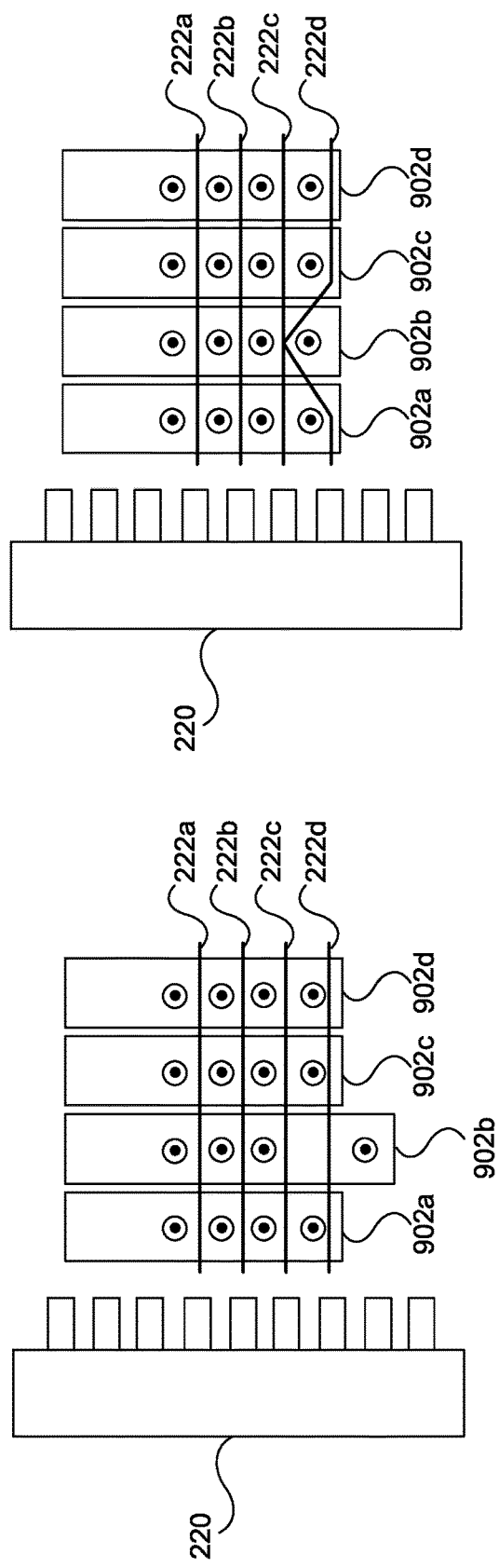

SYSTEMS AND METHODS FOR CONTINUOUS FABRICATION OF WOVEN COMPOSITE MATERIALS

CROSS-REFERENCE TO RELATED APPLICATIONS AND PRIORITY CLAIM

This application claims priority to U.S. Provisional Patent Application No. 62/336,974 filed May 16, 2016, entitled "Continuous Composite Formation," which is incorporated herein by reference as if set forth herein in its entirety.

FIELD

The disclosure relates to the field of woven composite materials. More specifically, the disclosure relates to the continuous manufacturing of woven composites with controllable internal fabric geometry.

BACKGROUND

A composite is a heterogeneous structure that consists of a combination of two or more different materials with significantly different properties. High-performance composites are widely used in the aerospace, automotive, defense, and biomedical industries, where high specific strength and modulus allow for the creation of strong, fuel-efficient vehicles and devices. However, current high-performance composites suffer from several deficiencies inherent to their manufacturing approach.

The two major types of composite materials are laminates and three dimensional ("3D") preforms. In the case of laminates, yarns are woven into fabrics, the fabrics are often preimpregnated with a matrix resin and then applied to a mold in a layerwise fashion. Layup is commonly done by hand, which makes laminates expensive and increases the likelihood of error. The layerwise nature of laminates also results in out-of-plane (i.e., between layers) properties that are as low as 10% of the in-plane properties, poor delamination resistance, and in-plane properties that are limited by the structure of the base fabric.

3D composite preforms have attempted to solve some of these issues, but they are they are constrained by the relative difficulty in making and working with a preform. These include difficulty attaining proper fiber alignment, limited composite forming techniques, and the risk of introducing crimp to the fabric as the preform is consolidated during the composite forming process. 3D preforms are three dimensional fabric structures formed by weaving yarns on a complex, computer controlled loom. This fabric structure is placed into a mold and infused with matrix resin. While this process has improved out-of-plane properties compared to laminates, the resin infusion process can result in the introduction of defects in the form of air bubbles, (e.g., voids) and kinked fibers.

Composites may be formed using additive manufacturing. However additive manufacturing is not able to form laminates or woven preforms and they are inherently weaker than conventionally formed composites. Current additive manufacturing methods use chopped fibers or continuous fibers. However, chopped fibers have reduced strength and toughness and due to the way continuous fibers are laid down there is no mechanical interlacing between fibers, which results in delamination failure or in-layer crack propagation. Further, known methods of forming composites using additive manufacturing are insufficient for quickly generating bulk quantities of composites.

Accordingly, there is a need for systems and methods to continuously form woven composite material with controllable internal geometry. Embodiments of the present disclosure are directed to this and other considerations.

SUMMARY

A machine for continuously fabricating a woven composite with controllable internal fabric geometry is disclosed. In one embodiment, a machine for continuously forming a woven composite material includes one or more spools for dispensing one or more warp filaments. The machine further includes a roller assembly configured to receive a composite weave comprising one or more warp filaments and one or more weft filaments. The machine further includes a warp rack comprising a plurality of warp heads for receiving one or more warp filaments from the one or more spools, where each warp head includes a plurality of filament channels positioned at different vertical locations along the height of the warp head and each filament channel is configured to engage a warp filament suspended between a spool of the one or more spools and the roller assembly. Each warp head is capable of independent vertical movement to adjust the height of warp filaments extending from the warp head toward the roller assembly. The machine further includes a weft inserter stack comprising a plurality of weft inserters for inserting one or more weft filaments between one or more warp filaments to form the composite weave.

One or more of the plurality of warp heads of the machine can include a heating element for heating one or more warp filaments.

One or more of the plurality of warp heads of the machine can include a temperature sensor.

The roller assembly of the machine can be configured to consolidate the composite weave.

The roller assembly of the machine can include a pair of heated rollers for heating the composite weave.

The roller assembly of the machine can include a pair of cooled rollers for cooling the composite weave.

The plurality of warp heads of the machine can be aligned adjacent to one another in a vertical plane.

One or more of the plurality of warp heads of the machine can be configured to move vertically to adjust the height of warp filaments associated with the respective one or more warp heads after one or more weft filaments have been inserted between one or more warp filaments.

The machine can further include a controller that is configured to control a sequence of vertical movements of one or more warp heads and insertions of one or more weft filaments between one or more warp filaments to create a composite weave having a predetermined pattern.

One or more of the plurality of weft inserters of the weft inserter stack of the machine can be configured to insert one or more weft filaments between one or more warp filaments such that each inserted weft filament is oriented approximately perpendicularly to the one or more warp filaments.

The weft inserter stack of the machine can be configured to simultaneously insert a first weft filament between a first pair of warp filaments and a second weft filament between a second pair of warp filaments.

One or more weft inserters of the machine can be a rapier weft inserter, an air-jet weft inserter, and/or an inertial weft inserter.

In another embodiment, a machine for continuously forming a woven composite material includes one or more spools for dispensing one or more warp filaments. The machine further includes a roller assembly configured to receive a composite weave comprising one or more warp filaments and one or more weft filaments. The machine further includes a warp rack comprising a plurality of heddle assemblies for receiving one or more warp filaments from the one or more spools, where each heddle assembly includes a first heddle comprising a first eye for engaging a first warp filament suspended between a spool of the one or more spools and the roller assembly and a second heddle having a slot for receiving the first warp filament and a second eye for engaging a second warp filament suspended between a spool of the one or more spools and the roller assembly. The first heddle and second heddle are capable of independent vertical movement to adjust the height of the first eye and second eye, respectively. The machine further includes a weft inserter stack comprising a plurality of weft inserters for inserting one or more weft filaments between one or more warp filaments to form the composite weave.

The plurality of heddle assemblies of the machine can be aligned adjacent to one another in a first vertical plane.

The first heddle of each heddle assembly can be positioned adjacent to the second heddle of the respective heddle assembly in a second vertical plane that is approximately perpendicular to the first vertical plane.

The first eye of the first heddle of a heddle assembly of the plurality of heddle assemblies can align with the slot of the second heddle of the heddle assembly when the heddle assembly is in a neutral position.

Each heddle assembly of the plurality of heddle assemblies can further include a third heddle having a slot for receiving the first warp filament and the second warp filament, and a third eye for engaging a third warp filament suspended between a spool of the one or more spools and the roller assembly, where the third heddle is capable of independent vertical movement to adjust the height of the third eye.

The machine can further include a controller configured to control a sequence of vertical movements of one or more of the first, second, and/or third heddles of one or more of the plurality of heddle assemblies and insertions of one or more weft filaments between one or more warp filaments to create a composite weave having a predetermined pattern.

A method for continuously fabricating a woven composite with controllable internal fabric geometry is also disclosed. The method uses a machine having a plurality of warp filaments suspended between a roller assembly and a warp rack that comprises a plurality of warp heads, wherein each warp head comprises a plurality of filament channels positioned at different vertical locations along the height of the warp head, each filament channel configured to engage a warp filament, and each warp head being capable of independent vertical movement to adjust the height of warp filaments associated with the respective warp head relative to the roller assembly. The method includes vertically positioning a first sub-group of the plurality of warp heads in a first vertical position and a second sub-group of the plurality of warp heads in a second vertical position such that the vertical height of each warp filament in a filament channel of a warp head of the first sub-group of the plurality of warp heads is higher than a warp filament in a corresponding filament channel of a warp head of the second sub-group of the plurality of warp heads. The method further includes inserting one or more weft filaments into a warp between the roller assembly and the warp rack, such that each weft filament is inserted between a warp filament associated with the first sub-group of the plurality of warp heads and a warp filament associated with the second sub-group of the plurality of warp heads. The method further includes securing the one or more weft filaments between two or more warp filaments to form a composite weave by vertically repositioning the first sub-group of plurality of the warp heads in a third vertical position and the second sub-group of the plurality of warp heads in a fourth vertical position such that the vertical height of each warp filament in a filament channel of a warp head of the first sub-group of the plurality of warp heads is lower than a warp filament in the corresponding filament channel of a warp head of the second sub-group of the plurality of warp heads. The method further includes consolidating the composite weave by activating the roller assembly to draw the composite weave through a pair of opposing rollers that are configured to heat and compress the composite weave.

The method can include creating the warp between the roller assembly and the warp rack by feeding a free end of each of a plurality of warp filaments originating from a plurality of filament spools through a unique filament channel of one of a plurality of warp heads of the warp rack and feeding the free end of each of the plurality of warp filaments through the pair of opposing rollers.

BRIEF DESCRIPTION OF THE DRAWINGS

FIG. 2A is a representative side view of a continuous composite weaving machine in accordance with an example embodiment.

FIG. 2B is a representative top view of a continuous composite weaving machine in accordance with an example embodiment.

FIG. 3A is a representative top view of a continuous composite weaving machine having a first plurality of warp heads in a first position and a second plurality of warp heads in a second position in accordance with an example embodiment.

FIG. 3B is a representative side view of a continuous composite weaving machine having a first plurality of warp heads in a first position and a second plurality of warp heads in a second position in accordance with an example embodiment.

FIG. 7A is a representative front cutaway view of a continuous composite weaving machine in accordance with an example embodiment.

FIGS. 7B and 7C are representative front cutaway views of a continuous composite weaving machine showing filament interlacing that occurs as warp heads move from a first vertical configuration (FIG. 7B) to a second vertical configuration (FIG. 7C) in accordance with an example embodiment.

FIGS. 8A and 8B are representative front cutaway views of a continuous composite weaving machine showing another example of filament interlacing that occurs as warp heads move from a first vertical configuration (FIG. 8A) to a second vertical configuration (FIG. 8B) in accordance with an example embodiment.

FIG. 9A is a representative side view of a continuous composite weaving machine having an alternative warp head configuration comprising of an assembly of heddles in accordance with an example embodiment.

FIG. 9B is a representative exploded view of a warp head configuration comprising an assembly of heddles in accordance with an example embodiment.

FIG. 9C is a representative front view of a warp head configuration comprising an assembly of heddles in accordance with an example embodiment.

FIG. 10 is a representative front cutaway view of a continuous composite weaving machine having a warp head configuration comprising an assembly of heddles in accordance with an example embodiment.

FIGS. 11A and 11B are representative front cutaway views of a continuous composite weaving machine having a warp head configuration comprising an assembly of heddles, showing an example of filament interlacing that occurs as heddles move from a first vertical configuration (FIG. 11A) to a second vertical configuration (FIG. 11B) in accordance with an example embodiment.

DETAILED DESCRIPTION

To facilitate an understanding of the principals and features of the disclosed technology, illustrative embodiments are explained below. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It must also be noted that, as used in the specification and the appended claims, the singular forms "a," "an" and "the" include plural referents unless the context clearly dictates otherwise.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Embodiments of the present disclosure present machines and methods for forming multiple layers of a woven composite in a single-step process. The woven composite may be created continuously and with a dynamically controllable internal fabric geometry that enables the creation of a woven composite having customized properties of strength, stiffness, and toughness. Spools of polymer impregnated filament may be loaded on one end of a continuous composite weaving machine and a multilayer composite panel may be output on the other side of the machine, with no additional lamination steps required. A continuous composite weaving machine of the present disclosure may also be configured to vary the density of the composite by change the spacing of warp and weft filaments relative to one another.

Figure 1:
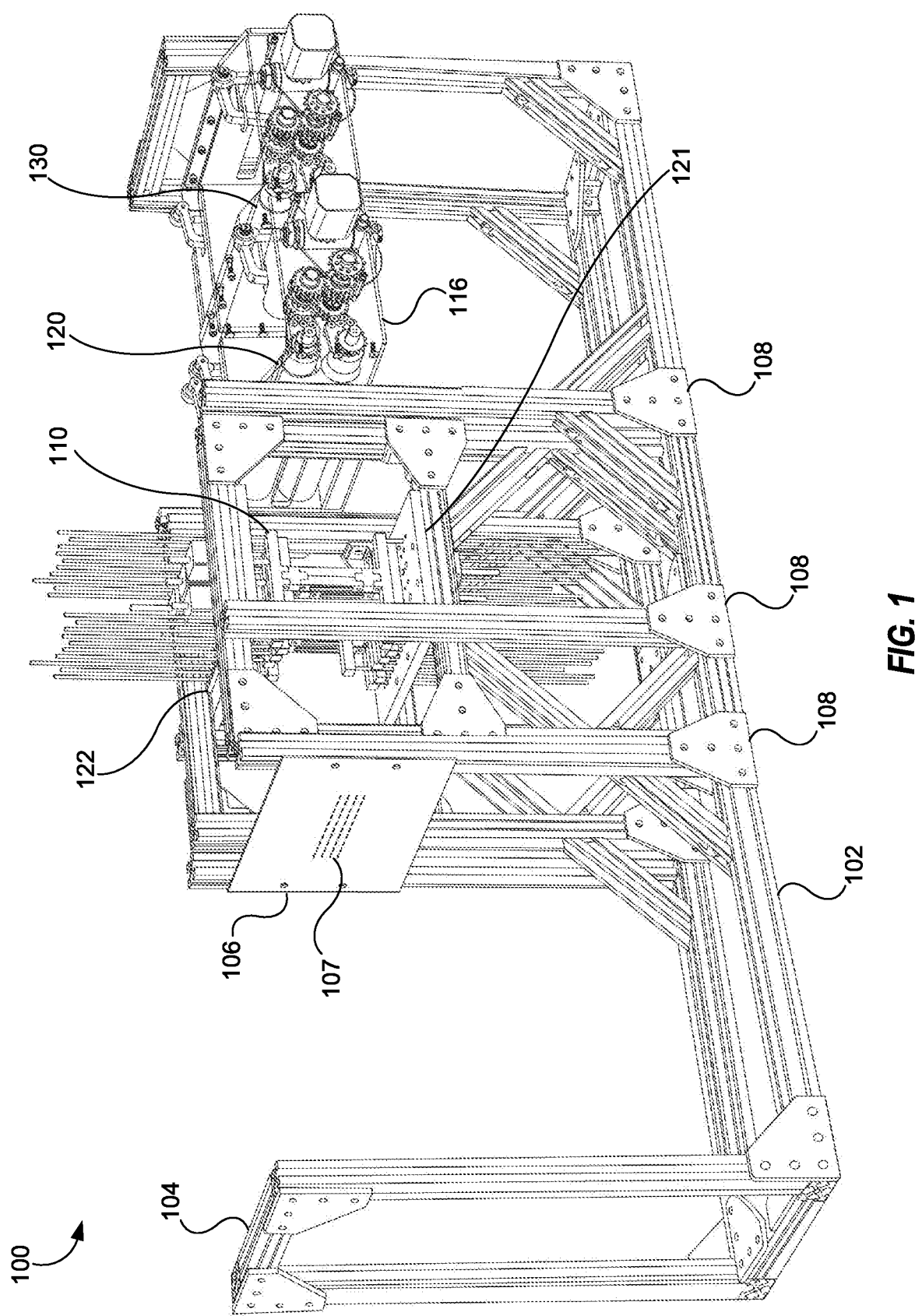
FIG. 1 is a partial schematic illustrating an embodiment of a continuous composite weaving machine in accordance with an example embodiment.

Referring now to the figures, in which like reference numerals represent like parts, various embodiments of the disclosure will be disclosed in detail. FIG. 1 is an illustration of a partial schematic for a machine 100 for continuously forming a composite weave with controllable internal fabric geometry (which may also be referred to as a continuous composite weaving machine 100). The machine 100 may include a frame 102 for supporting a warp rack 110 and a roller assembly 116. As described in greater detail below, warp rack 110 may include a plurality of warp heads positioned between a base plate 121 and a top plate 122. Frame 102 may optionally support a weft inserter stack (not shown in FIG. 1) or a weft inserter stack may be independently positioned adjacent to frame 102. Frame 102 may include a plurality of posts 108 that can be used to support insulation panels mounted around the warp rack 110, roller assembly 116, or other portions of continuous composite weaving machine 100. Frame 102 may include a spool rack mount 104 for supporting a plurality of filament spools (not shown). Each filament spool may contain a roll of warp filament that comprises, for example, a continuous yarn or tow preimpregnated or coated with a thermoplastic polymer. The material of the yarn or tow can include, but is not limited to, carbon fiber, aramid fiber, glass fiber, or metallic fiber. The fibers (or combination of fibers) may be selected based on the desired mechanical or electrical properties. The free end of the warp filament of each filament spool may be fed into roller assembly 116 via warp rack 110.

Roller assembly 116 may include a first pair of rollers 120 that are configured to receive a plurality of warp filaments. Roller assembly 116 may create tension in the warp filaments by "pinching" the warp filaments between the first pair of rollers 120. In other words, rollers of roller assembly 116 may apply a compressive force to the warp filaments that causes the warp filaments to be propelled forward when the rollers rotate in the appropriate opposing directions. The first pair of rollers 120 may provide compression of the composite weave by applying a compression force to the composite weave as the weave is pulled through the first pair of rollers 120. Roller assembly 116 may further include a second pair of rollers 130 to provide additional compression of the composite weave. According to some embodiments, the first pair of rollers 120 and/or second pair of rollers 130 may be powered by one or more motors to draw the warp filaments off of the plurality of filament spools. In some embodiments, the first pair of rollers 120 may include a heating element to heat the materials and consolidate the composite. For example, the first pair of rollers 120 may include a resistive heater in a cartridge form. A cartridge heater may be installed concentric to a roller of the first pair of rollers 120 and thermal grease may be used to thermally link the heater to the roller, while allowing the roller and the cartridge heater to maintain mechanical independence from one other. In some embodiments, a heating element may perform induction heating or the heating element may be heated working fluid that is pumped through the roller. Further, according to some embodiments, the second pair of rollers 130 may include a cooling element to solidify and cool the polymer matrix to control the crystallinity of the polymer in the resulting composite. For example, a cooling element may be a cartridge-type heat exchanger that is mounted concentric to a roller of the second pair of rollers 130 and interfaced with thermal grease. The cartridge-type heat exchanger may have chilled water (or some other working fluid) pumped through it to provide a cooling effect. Alternatively, a cooling function optionally performed by the second pair of rollers 130 may be achieved using a cryogenic liquid (e.g., liquid nitrogen) to generate a super-cooled gas that may be directed to flow over the hot filaments to cool them.

When a plurality of warp filaments from the plurality of filament spools are suspended between roller assembly 116 and warp rack 110, roller assembly 116 and warp rack 110 may sufficiently engage the plurality of warp filaments to create tension in the warp filaments such that the warp filaments extend between warp rack 110 and roller assembly 116 in substantially straight lines. These substantially straight portions of warp filaments suspended between warp rack 110 and roller assembly 116 may form a warp that is capable of receiving weft filaments from one or more weft inserters of a weft inserter stack to form a weave as described in greater detail below. As will be appreciated by those of skill in the art, a warp may be a plurality of warp filaments in which one or more of the warp filaments is offset from the others by some distance or some angle. Accordingly, a plurality of warp filaments may be disposed parallel to one another between warp rack 110 and roller assembly 116 in direction that is perpendicular to the length of the first pair of rollers 120 of roller assembly 116, although as explained in greater detail below, some or all of the plurality of warp filaments may be disposed at different vertical heights or angles (i.e., the angle at which a warp filament inclines/declines out of warp rack 110 towards roller assembly 116) to one another. As shown in further detail in FIG. 6, a weft inserter stack may include a plurality of vertically stacked weft inserters. As will be appreciated by those of skill in the art, one or more weft inserters of a weft inserter stack may be a rapier weft inserter, an air-jet weft inserter, and/or an inertial weft inserter. For example, one or more weft inserters of the weft inserter stack may be a rack-and-pinion rapier or an air-jet insertion system as described in paragraphs [0076]-[0079] of U.S. Pat. Pub. No. 2016/0305051.

Machine 100 may optionally include a filament guide plate 106 disposed between spool rack mount 104 and warp rack 110. Filament guide plate 106 may be a rigid plate that includes a plurality of apertures 107 for receiving warp filaments from the plurality of filament spools mounted on spool rack mount 104 in order to guide them into warp rack 110. Each warp filament may be threaded through a distinct aperture 107 of a filament guide plate 106 prior to being threaded through warp rack 110. Filament guide plate 106 may serve to constrain the vertical movement of the portions of the warp filaments that extend between the plurality of filament rollers and filament guide plate 114 by constraining the position of each warp filament at its corresponding aperture 107. Filament guide plate 106 may also serve to restrict the lateral movement of the plurality of warp filaments by providing an anchor point at each aperture 107. Accordingly, filament guide plate 106 is advantageous because it enables the plurality of warp filaments to be received by warp rack 110 without risk of warp filaments coming into contact with one other or becoming entangled due to variations in the tautness of the warp filaments caused by continuous movement through machine 100.

Although not shown in FIG. 1, spool rack mount 104 is capable of mounting a plurality of filament spools in a grid-like configuration such that the plurality of filament spools are arranged in parallel rows and columns. For example, spool rack mount 104 can support four rows of ten filament spools that correspond to the four rows of ten apertures 107 of filament guide plate 106 shown in FIG. 1, such that each filament spool can feed into a distinct aperture 107. Although FIG. 1 shows a machine 100 configured to utilize 40 warp filaments (i.e., four rows of ten warp filaments corresponding to apertures 107 of filament guide plate 106), machine 100 is not so limited and it is contemplated that any number of warp filaments may be used by increasing or decreasing the number of filament spools and warp rack 110.

FIGS. 2A and 2B show a representative side view and top view of a continuous composite weaving machine 100, respectively. As described above with respect to FIG. 1, a plurality of filament spools 210 (that may be mounted on spool rack 104) feed a plurality of warp filaments 212 into the first pair of rollers 120 of roller assembly 116 via warp rack 110. FIGS. 2A and 2B represent a four by four grid of filament spools 210 that dispense a total of 16 warp filaments 212. As shown in FIG. 2A, the plurality of warp filaments 212 may constitute multiple rows of warp filaments 212a, 212b, 212c, 212d that each include a plurality of warp filaments 212 that are aligned with one another when viewed from the side. Each row of warp filaments 212a, 212b, 212c, 212d originates from a plurality of filament spools 210 mounted at a different vertical height of spool rack mount 104. As shown in FIG. 2B, the plurality of warp filaments 212 may constitute multiple columns of parallel warp filaments 212e, 212f, 212g, 212h that each include a plurality of warp filaments 212 that are aligned with one another when viewed from the top. For simplicity and ease of viewing, many of the figures herein only depict 16 warp filaments 212 (i.e., four rows and four columns of warp filaments 212), it should be understood that continuous composite weaving machine 100 may utilize many more warp filaments in practice, such as for example, the 40 warp filaments 212 described with respect to FIG. 1.

FIGS. 2A and 2B illustrate the process flow of forming a woven composite material 230 using continuous composite weaving machine 100. Roller assembly 116 is configured to draw the plurality of warp filaments 212 off of the plurality of filament spools 210 via warp rack 110. In some embodiments, roller assembly 116 may be configured to continuously pull the warp filaments 212 at a constant or variable rate, while in other embodiments roller assembly 116 may be configured to repeatedly pull the warp filaments 212 in discrete "tugs" separated by a predetermined or variable increment in time. Prior to being drawn into roller assembly 116, a weft inserter stack 220 can insert one or more weft filaments 222 into the warp formed by the plurality of warp filaments 212 to form a weave. A weft filament 222 may have a minimum length that is long enough to span the distance between the two outer columns of warp filaments 212e, 212h as shown in FIG. 3A. Weft filaments 222 may be made of a yarn or tow preimpregnated or coated with a thermoplastic polymer. The material of the yarn or tow can include, but is not limited to, carbon fiber, aramid fiber, glass fiber, or metallic fiber. Weft filaments 222 may also be made from a discontinuous fiber reinforced thermoplastic.

After weft filaments 222 are inserted between warp filaments 212 to form a weave, the weave may then be compressed into a composite material by roller assembly 116 which applies a compression force to the weave. To aid in the formation of the composite material 230, machine 100 may include a heated zone 240 to heat the plurality of warp filaments 212 and the one or more weft filaments 222 to meld them together. Warp filaments 212 may be kept at room temperature prior to entering heated zone 240. Within the heated zone 240, the filament temperature may be kept above the glass transition temperature ($T_g$) of the matrix polymer to permit bonding of the filaments. For example, warp rack 110 may heat the filaments above Tg, and heated zone 240 may cause the filaments to continue to heat until the temperature of the filaments is above a melting temperature ($T_m$) prior to the filaments reaching roller assembly 116. Heated zone 240 may be created by heating elements associated with warp rack 110, heating elements associated with the first pair of rollers 120, insulation panels mounted on posts 108 of the frame 102, or some combination thereof. According to some embodiments, the heating functions described above may alternatively be performed by an ultrasonic welding bar that can vibrate the material to generate heat by elastic losses, an inductive heater that induces current in the material by generating an alternative or rotating magnetic field to generate heat through resistive losses, a convection device (e.g., convection oven) that circulates hot air around the material, a microwave heating device, or any other such heating method known or later-developed in the art.

As mentioned above, roller assembly 116 may optionally include a second pair of rollers 130 to add a further compression force to the weave. The second pair of rollers 130 may have an associated cooling element that can create a cooled zone 250 for cooling the previously heated weave of warp and weft filaments 212, 222 to accelerate the formation of a woven composite material 230. In the cooled zone 250, the composite temperature may be reduced below the glass transition temperature ($T_g$) of the matrix polymer. Crystallinity in the matrix polymer can be controlled by varying the feed rate and distance between the first pair of heated rollers 120 and the second pair of cooled rollers 130, as this will determine the amount of time the polymer is between its glass transition ($T_g$) and melt temperature ($T_m$). Although embodiments of roller assembly 116 are described as having a first pair of heated rollers 120 for heating the woven composite and a second pair of cooled rollers 130 for cooling the woven composite, it is also contemplated that roller assembly 116 may include any number of pairs of heated and/or cooled rollers to control the crystallinity in the matrix polymer. For example, roller assembly 116 may include three or more pairs of rollers, where each pair of rollers is set to a specified temperature range such that the temperature is the greatest at the first pair of rollers that the composite weave is drawn into and coldest at the last pair of rollers, with each intermediate pair of rollers reducing the temperature between the first and last pairs of rollers by an increment.

Continuous composite weaving machine 100 may include a controller 260 that may be in electronic communication with warp rack 110, roller assembly 116, and weft inserter stack 220. Controller 260 can be a variety of electronic devices programmable to control the various functions of the continuous composite weaving machine, such as, for example, the vertical movement of warp heads or heddle assemblies of the warp rack 110, heating elements of the warp rack 110, the rotation speed of some or all of the rollers of roller assembly 116, compression forces applied by some or all of the rollers of roller assembly 116, heating and/or cooling elements of roller assembly 116, and insertion of weft filaments by the weft inserter stack 220. Furthermore, controller 260 can control the relative timing of the advancement of materials through roller assembly 116, the insertion of weft filaments from weft inserter stack 220, and the changes in warp head or heddle configurations of warp rack 110 so that continuous composite weaving machine 100 may continuously output woven composite material 230. In some embodiments, controller 260 may store and execute predetermined programs to cause composite weaving machine 100 to produce a woven composite material 230 having a predetermined design. Controller 260 can be a microcontroller that is, for example, programmable or pre-programmed (e.g., application specific integrated circuits (ASICs)). Alternatively, the controller can be a PC, server, mainframe, or other computer programmed device that controls aspects of continuous composite weaving machine 100. Controller 260 can include an application (or, "app") on a smartphone or tablet. Controller 260 can be connected to the system using, for example, a direct wired connection, a local area network (LAN), a wireless local area network (WLAN), an internet connection, a wireless connection, Bluetooth, near-field communication (NFC), or a cellular or radio connection. Controller 260 can also be networked via a similar connection to enable remote operation and control.

Figure 3C:
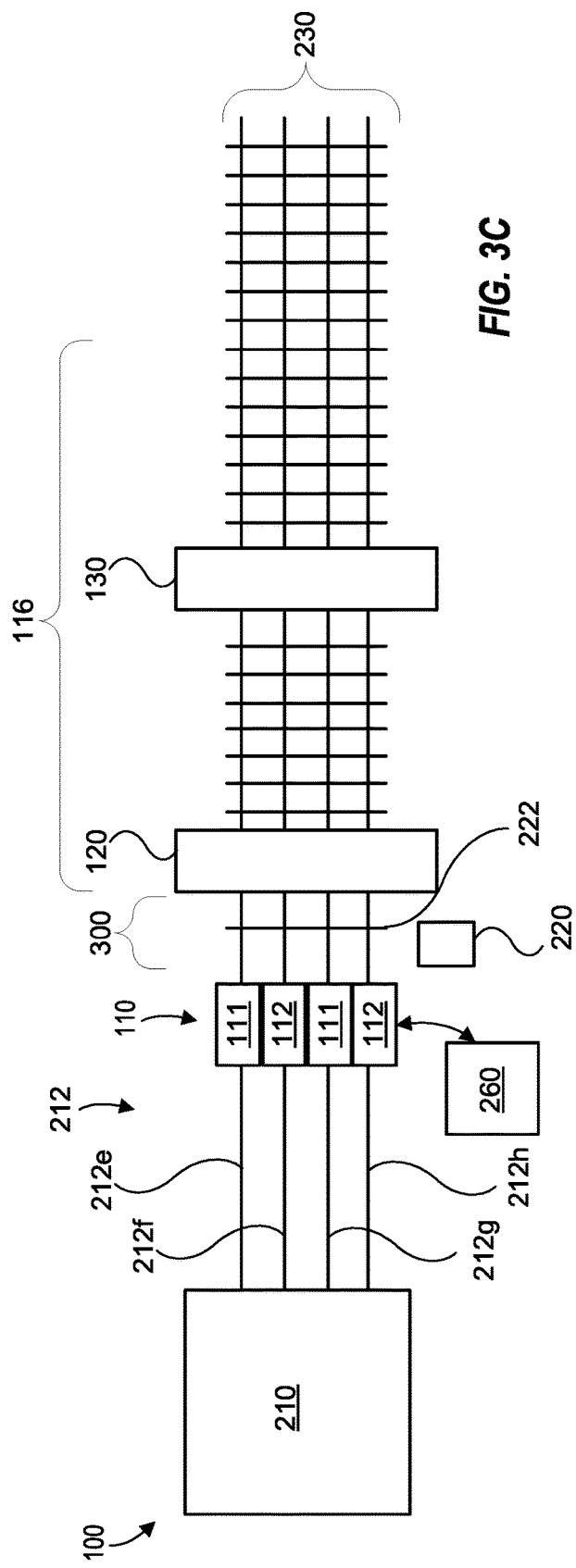
FIG. 3C is a representative top view of a continuous composite weaving machine having the first plurality of warp heads in the second position and the second plurality of warp heads in a first position in accordance with an example embodiment.

FIGS. 3A through 3D illustrate the process of creating a weave by adjusting the vertical positions of the plurality of warp filaments 212 relative to one another. The vertical position of a warp filament may refer to the vertical height of the warp filament 212 at warp rack 110. As will be appreciated, by changing the height of a warp filament 212 at warp rack 110, the angle that the warp filament 212 extends towards warp rack 110 from its corresponding filament spool 210 may change. Further, the angle at which the warp filament extends towards roller assembly 116 from warp rack 110 (the "warp angle") will also change as the height a warp filament 212 is adjusted. A warp 300 may be created by adjusting the heights of the plurality of warp filaments 212 so that at least one sub-group of warp filaments 212 has a different height or warp angle than a second sub-group of warp filaments 212. As shown in FIG. 3B, warp filaments 212 originating from the same row of filament spools 210 that have the same height at the warp rack 110 will be aligned in a row when view from the side.

Figure 3D:
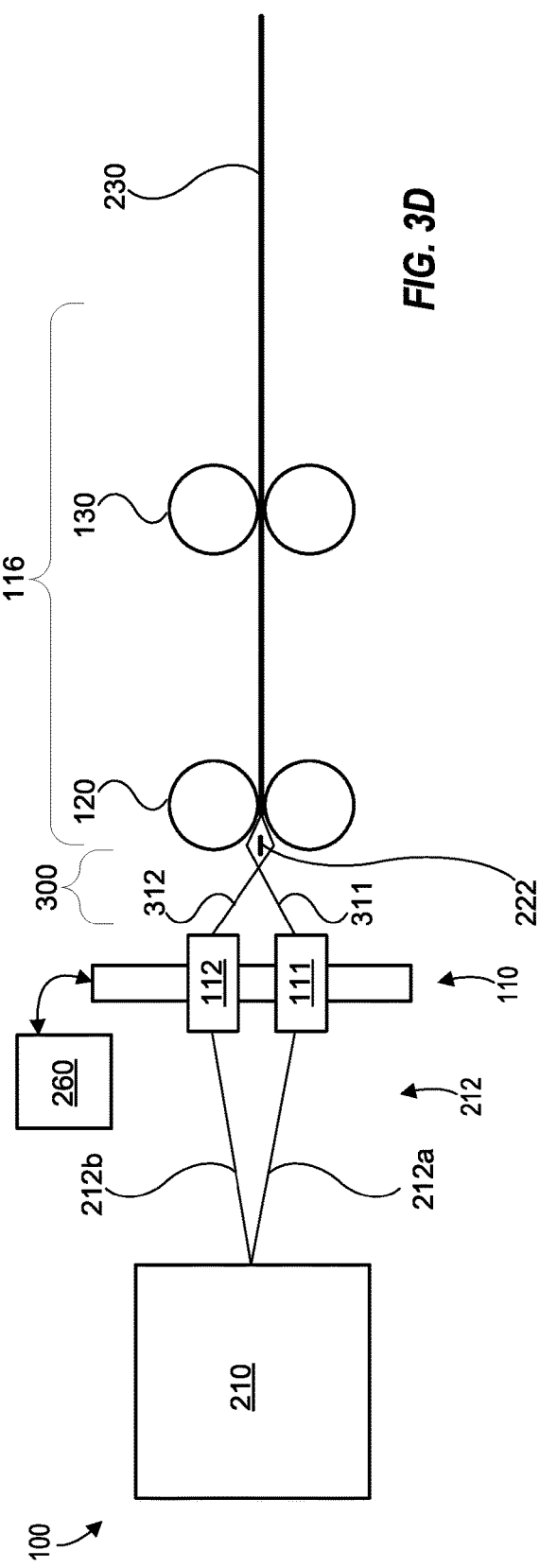
FIG. 3D is a representative side view of a continuous composite weaving machine having the first plurality of warp heads in the second position and the second plurality of warp heads in a first position in accordance with an example embodiment.

As described in greater detail below, each of a plurality of warp heads of warp rack 110 is configured to move vertically to adjust the height of the warp filaments 212 that are engaged by it. FIGS. 3A and 3B represent the plurality of warp heads of warp rack 110 in a first vertical configuration, whereas FIGS. 3C and 3D represent the plurality of warp heads of warp rack 110 having moved to a second vertical configuration. As shown in FIGS. 3A and 3B, a first row 212a of a first group of warp filaments 212e, 212g may be associated with a first group of warp heads 111 that are initially positioned at a first height, and a second row 212b of a second group of warp filaments 212f, 212h may be associated with a second group of warp heads 112 that are initially positioned at a second height that is lower than the first height. The relative positions of the portion 311 of the first row 212a positioned between warp rack 110 and roller assembly 116 and the portion 312 of the second row 212b positioned between the warp rack 110 and roller assembly 116 form a warp 300 that may receive one or more weft filaments 222. Accordingly, when in the first vertical configuration, a weft filament 222 can be inserted by a weft inserter stack 220 between the first row 212a of warp filaments 212e, 212g and the second row 212b of warp filaments as shown in FIG. 3B. Following the insertion of the weft filament 222 into warp 300 (i.e. between two or more warp filaments 212), the plurality of warp heads of warp rack 110 may adjust their vertical positions to a second vertical configuration such that the first row 212a of warp filaments 212e, 212g is positioned below the second row 212b of warp filaments 212f, 212h. As shown in FIG. 3D, this inversion of the plurality of warp heads of warp rack 110 may cause the portions 311, 312 of the first and seconds rows 212a, 212b of the plurality of warp filaments 212 to cross over one another behind the inserted weft filament 222, thereby creating a weave and securing the weft filament 222 between the plurality of warp filaments 212. The portion of the weave containing the weft filament 222 may then be drawn into roller assembly 116 for compression into woven composite material 230 as described above.

For simplicity and ease of viewing, FIGS. 3A-3D only depict one row of filament spools 210 that result in the creation of two rows 212a, 212b of warp filaments 212 based on the vertical configuration of the warp heads of warp rack 110, however it should be understood that it is contemplated that continuous composite weaving machine 100 may include more rows of warp filaments 212. For example, as previously described, continuous composite weaving machine 100 may include four or more rows of warp filaments 212 extending out of the plurality of filament spools 210. Further, as described below, the plurality of warp heads of warp rack 110 are capable of adjusting their relative vertical heights to create a dynamic number of rows in warp 300. Further, although FIGS. 3A-3D only depicts the insertion of a single weft filament 222, it should be understood that weft inserter stack 220 may simultaneously insert a plurality of weft filaments 222 at different vertical heights of the warp as desired. In this way, and as shown in greater detail below with respect to FIGS. 7A through 11B, continuous composite weaving machine 100 may dynamically create a variety of different weave patterns through a series of height adjustments to the plurality of warp heads of warp rack 110 and selective insertion of one or more weft filaments 222 into warp 300.

Figure 4A:
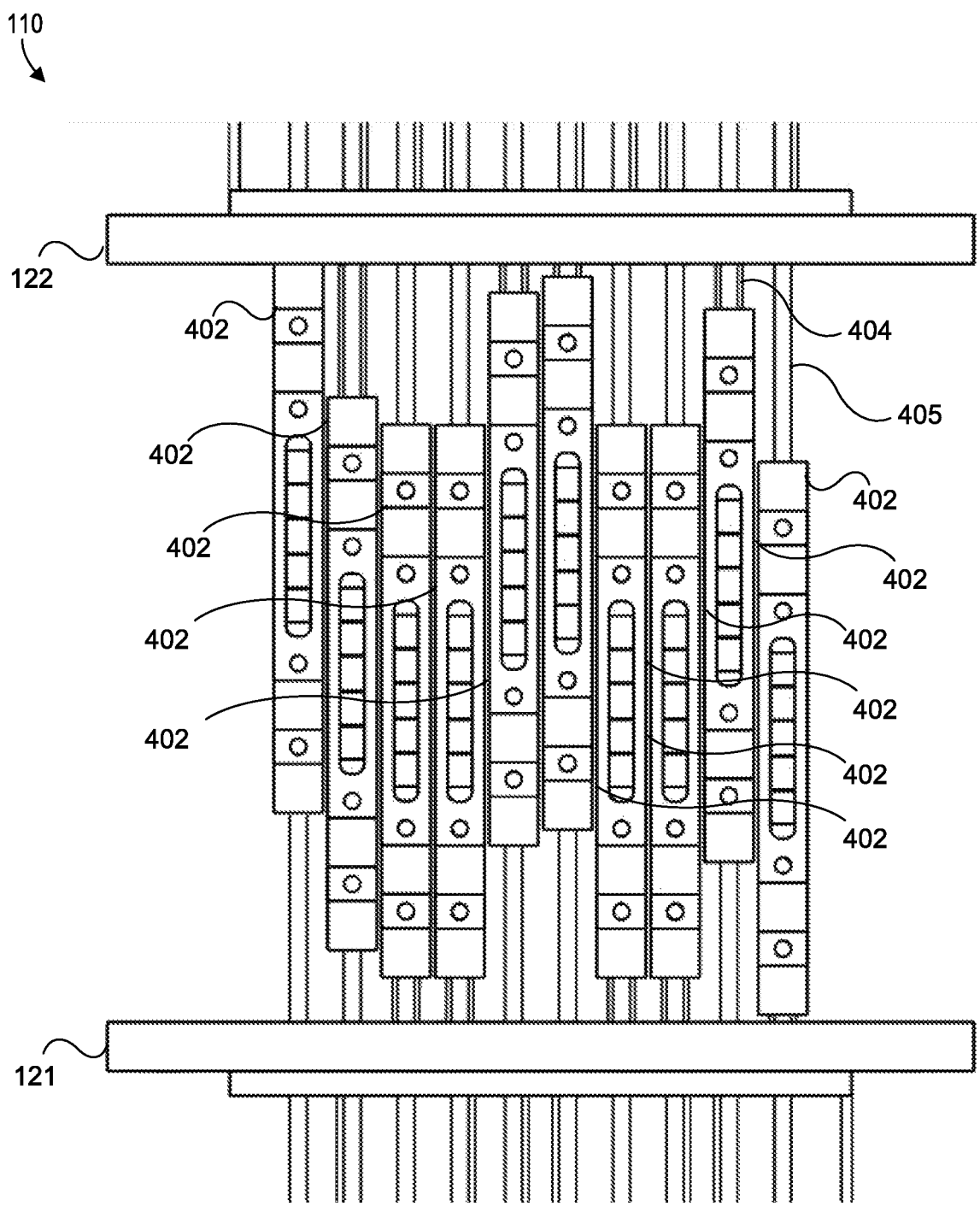
FIGS. 4A and 4B are front and rear views, respectively, of a warp rack of a continuous composite weaving machine in accordance with the present disclosure.
Figure 4B:
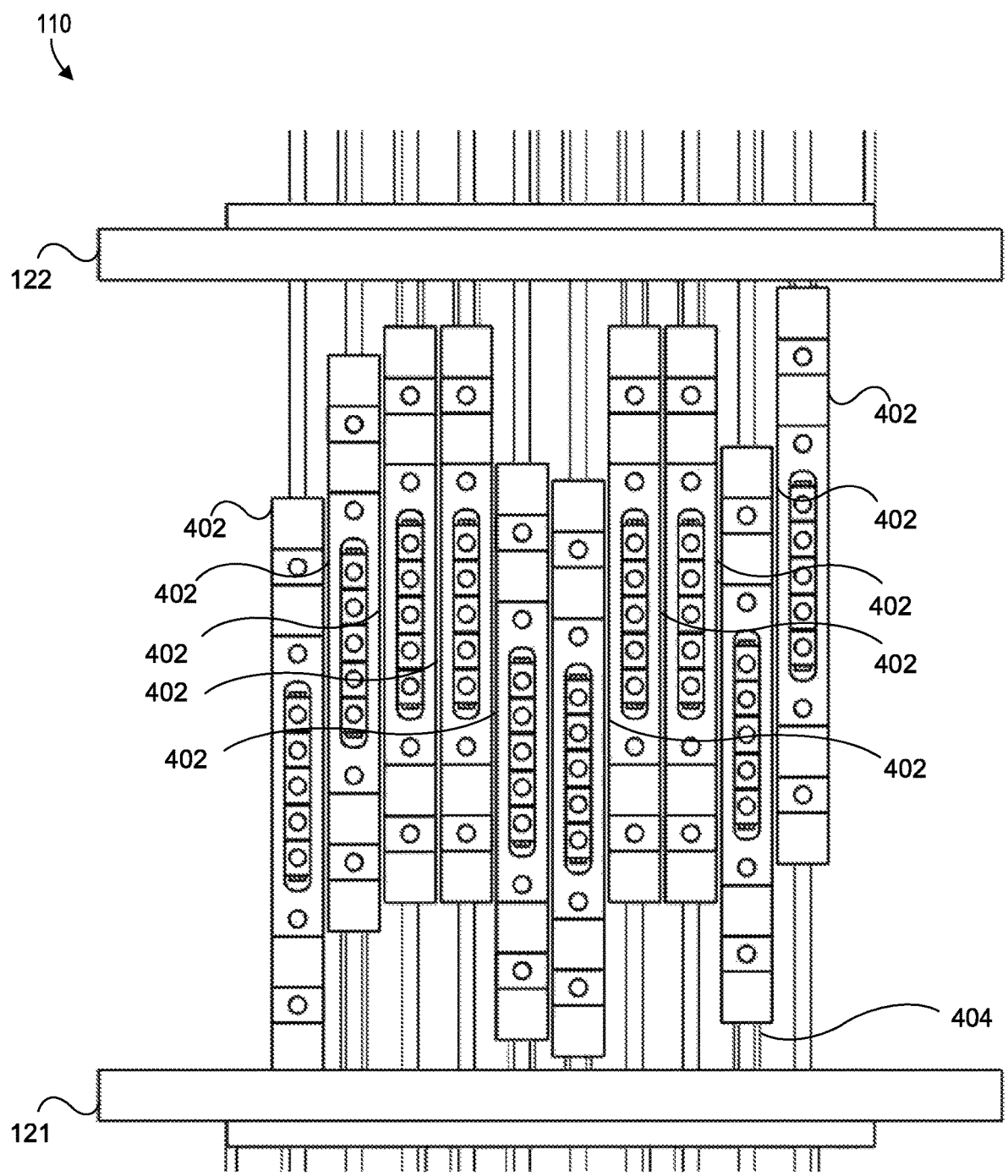

FIGS. 4A and 4B show front and rear views of a warp rack 110 having a plurality of warp heads 402. As shown, each of the plurality of warp heads 402 may be aligned adjacent to one another in a vertical plane. Each warp head 402 may be mounted on a lead screw 404 that enables the warp head 402 to move vertically. A lead screw 404 associated with a particular warp head may be positioned above or below the warp head 402. Each warp head 402 may also be mounted on one or more linear shafts 405 constrains warp head 402 from moving laterally. The vertical movement of each of the warp heads 402 may be constrained by a base plate 121 positioned beneath the plurality of warp heads 402 and a top plate 122 positioned above the plurality of warp heads 402. In some embodiments, the vertical movement the warp heads 402 may be constrained by limit switches, beam-based sensors, or encoders on the motors that drive the motion of the warp heads. As will be understood by those of skill in the art, each lead screw 404 may be powered by a motor that can cause the lead screw 404 to rotate, thereby adjusting the vertical position of the associated warp head 402 upwards or downwards, based on the direction of rotation of the lead screw 404. Each motor may be controlled by the controller 260. In some embodiments, the vertical movement of one or more warp heads 402 may be driven by a solenoid-based system, a hydraulic system, a pneumatic system, a rack and pinion, or any other such suitable system for enabling selectively controllable vertical movement of a warp head 402 in a warp rack 110.

Each warp head 402 of the plurality of warp heads 402 may be capable of vertical movement that is independent of the other warp heads 402. Thus, according to some embodiments, each warp head 402 of the plurality of warp heads 402 may be enabled to be dynamically positioned at a different vertical height from one another. In some embodiments, sub-groups of the plurality of warp heads 402 may be configured to move in tandem such that each of the warp heads 402 of the sub-group maintain the same respective height. In some embodiments, sub-groups of the plurality of warp heads 402 may be dynamically formed and unformed by controller 260.

Figure 5A:
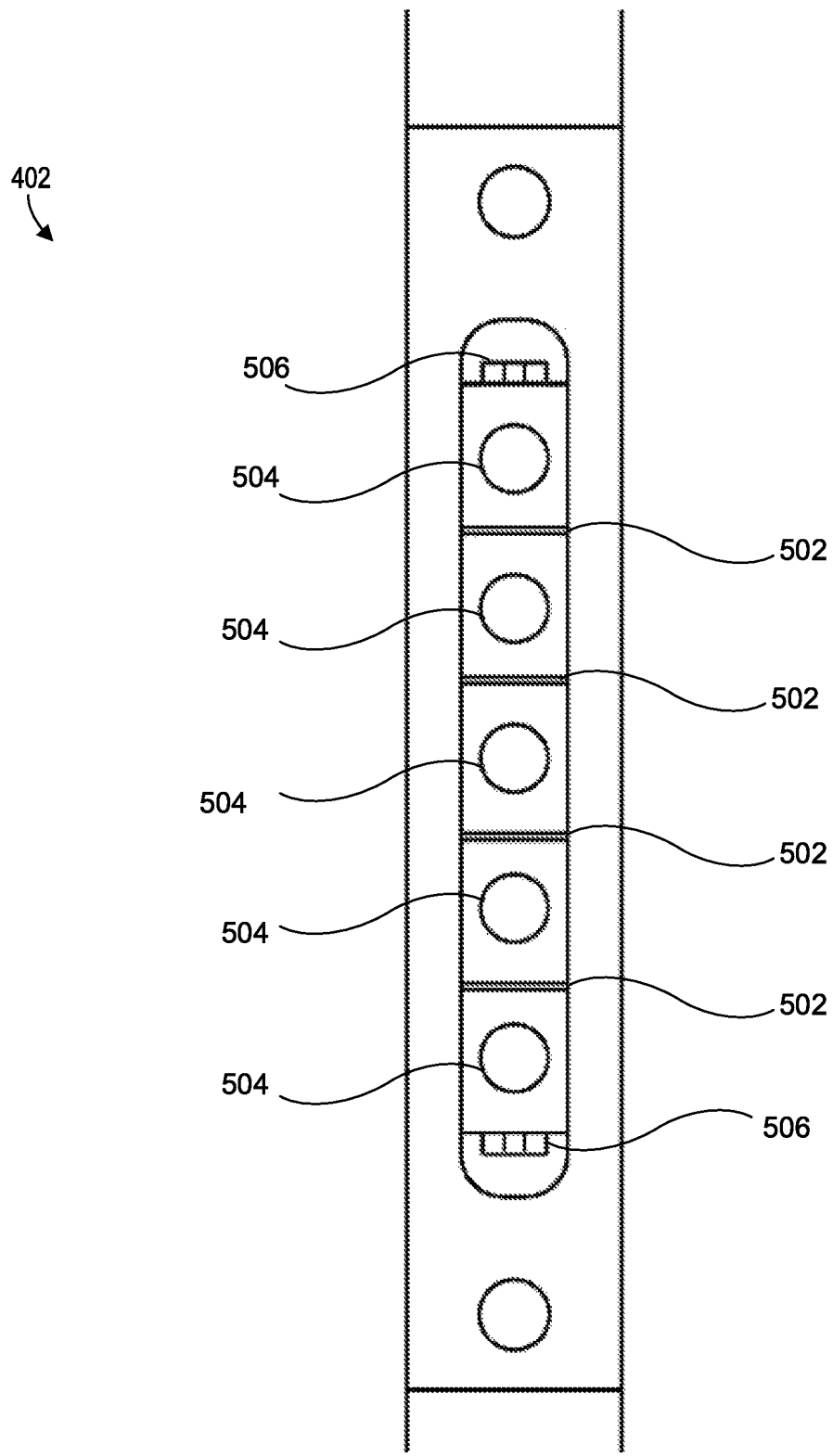
FIG. 5A is a rear view of a warp head in accordance with an example embodiment.

FIG. 5A shows a rear view of a warp head 402 of the warp rack 110 of FIGS. 4A and 4B, according to an example embodiment. Warp head 402 may include a plurality of filament channels 502, a plurality of heating elements 504, and one or more temperature sensors 506. The plurality of filament channels 502 may be positioned at different locations along the vertical axis of warp head 402 (i.e, along the height of warp head 402). Each filament channel 502 may be a slot that runs from the front face of warp head 402 to the rear face of warp head 402 such that a warp filament 212 may pass through warp head 402 via filament channel 502. Filament channel 502 is configured to engage or receive a warp filament 212 such that filament channel 502 will vertically anchor the warp filament 212 based on the vertical position of the warp head 402. In other words, as warp head 402 moves upwards or downwards as described above with respect to FIGS. 4A and 4B, the plurality of warp filaments 212 that pass through the respective filament channels 502 of the warp head 402 correspondingly move upwards or downwards at the point at which they pass through the respective filament channel 502. Filament channel 502 may be configured to constrain the lateral movement of an inserted warp filament 212 while allowing the warp filament 212 to be freely drawn in a forwards or backwards direction through the filament channel 502. In some embodiments, filament channel 502 may be configured to exert a drag force on a warp filament 212 as it passes through the channel, which can enable the filament shape and/or size to be adjusted by the warp head 402. For example, in some embodiments, the dimensions of a filament channel 502 on the rear face of warp head 402 may be different from dimensions of the filament channel 502 on the front face of the warp head 402, allowing excess resin to be squeezed out and/or allowing the warp filament 212 to be reshaped (similar to pultrusion).

Heating elements 504 may be internally integrated into warp head 402 on either side of a given filament channel 502 to heat the warp filament 212 as it passes through filament channel 502. Heating elements may be for example, but not limited to, resistive cartridge heaters or induction coils. One or more temperature sensors 506 may be integrated within warp head 402 to monitor the temperature generated by heating elements 504. In some embodiments, warp heads 402 may be configured to heat the warp filaments 212 to a minimum temperature that is above the glass transition temperature ($T_g$) of the warp filament 212 polymer. For example, in some embodiments, warp heads 402 may be configured to heat the warp filaments 212 to approximately 20-30 degrees Celsius below the melting temperature ($T_m$) of the warp filaments 212. As described above, as the warp filaments 212 move from warps heads 402 through heated zone 240 to roller assembly 116, the temperature of warp filaments 212 may be raised to above a specified temperature prior to reaching roller assembly 116, such as for example, $T_m$. Although not shown, machine 100 may include temperature sensors within heated zone 240, roller assembly 116, and/or cooled zone 250 to monitor the temperature of the filaments and/or weave. Controller 260 may receive one or more signals from one or more temperature sensors 506 of a warp head 506 that indicate the temperature of the warp head 506 and controller 260 may send a signal to one or more of the heating elements 504 to adjust their output of heat. Controller 260 may send a signal to increase the heat output of the heating elements of one or more warp heads 402 if controller receives a signal from a temperature sensor 506 indicating the temperature at a warp head 402 is below a minimum temperature, such as, for example, $T_g$.

Figure 5B:
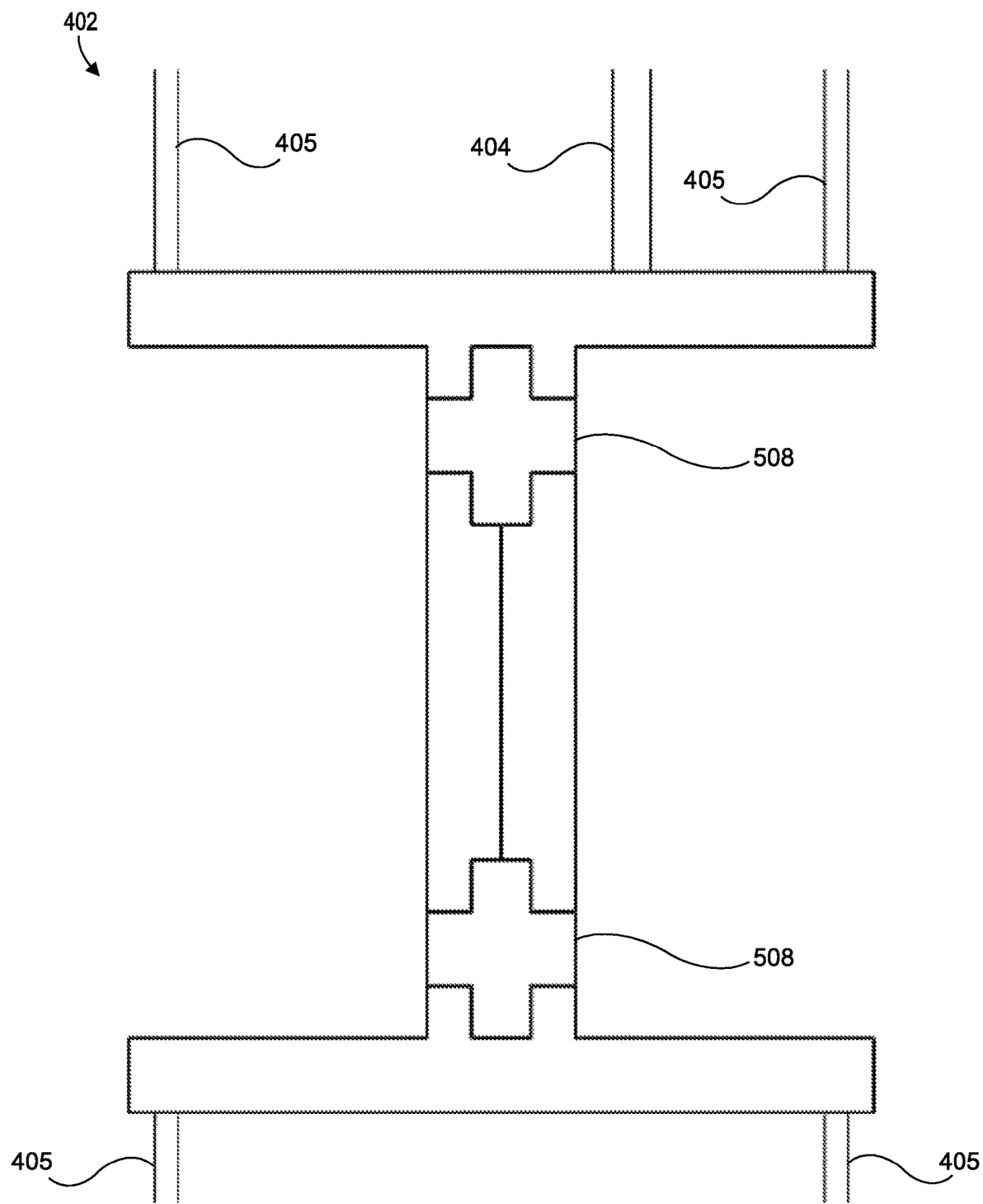
FIG. 5B is a side view of a warp head in accordance with an example embodiment.
Figure 5C:
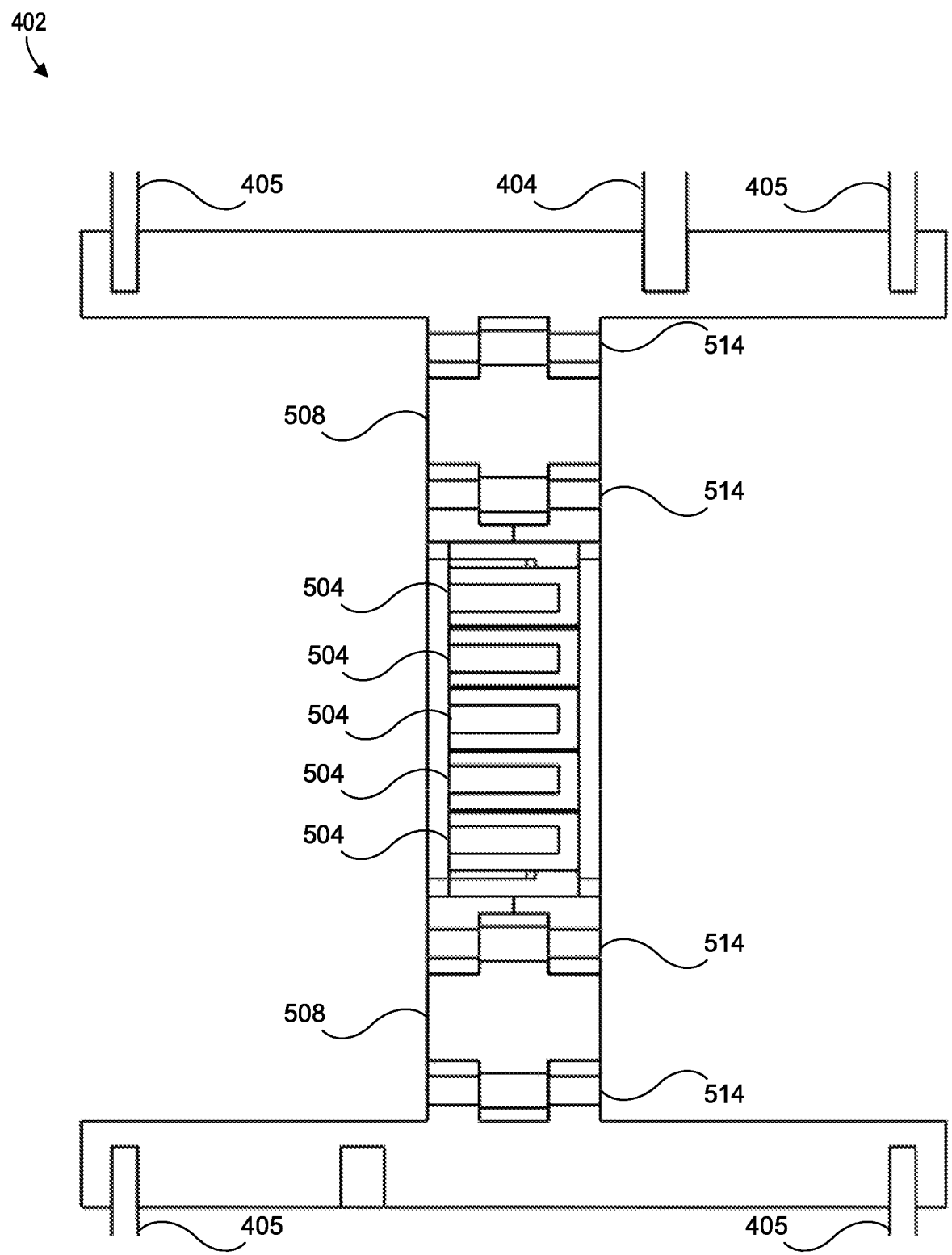
FIG. 5C is a cross-sectional side view of a warp head in accordance with an example embodiment.

FIGS. 5B and 5C show a side view and a cross-sectional side view of a warp head 402, respectively, according to an example embodiment. As previously described, warp head 402 may be mounted on a lead screw 404 that facilitates the vertical movement of warp head 402. Warp head 402 may also include a plurality of linear shafts 405 that may resist the torsion caused by lead screw 404 and laterally stabilize warp head 402 within the warp rack 110. For example, as shown in FIG. 1, the plurality of linear shafts 405 extending out of the bottom portion of warp heads 402 of warp rack 110 are received by apertures of base plate 121 and the plurality of linear shafts 405 extending out of the top portion of warp heads 402 of warp rack 110 are received by apertures of top plate 122, thereby constraining each warp head 402 in an individual vertical plane that runs parallel to the other warp heads 402. Warp head 402 may include one or more insulators 508, that may be for example, ceramic insulators 508. A ceramic insulator 508 is advantageous because it can be used with any filament, regardless of the melting temperature ($T_m$). If a warp filament 212 with a low $T_m$ is used (e.g., polypropylene or polyethylene), then a high temperature polymer insulator 508 may be utilized instead of a ceramic insulator 508. According to some embodiments, an insulator 508 may be positioned both above and below the plurality of heating elements 504 to prevent heat transfer from the heating elements 504 to the lead screw 404, linear shafts 405, base plate 121, top plate 122, or any other portion of warp rack 110 that may be undesirable to heat. As shown in FIG. 5C, warp head 402 may include one or more bolt holes 514 for bolts or screws to removably secure the components of warp head 402 together to allow for modularity. For example, in some embodiments, a filament channel 502 of warp head 402 may be removed and replaced if it becomes clogged. Further, filament channels 502 may be added or removed to build composites having a customized number of different layers.

Figure 6:
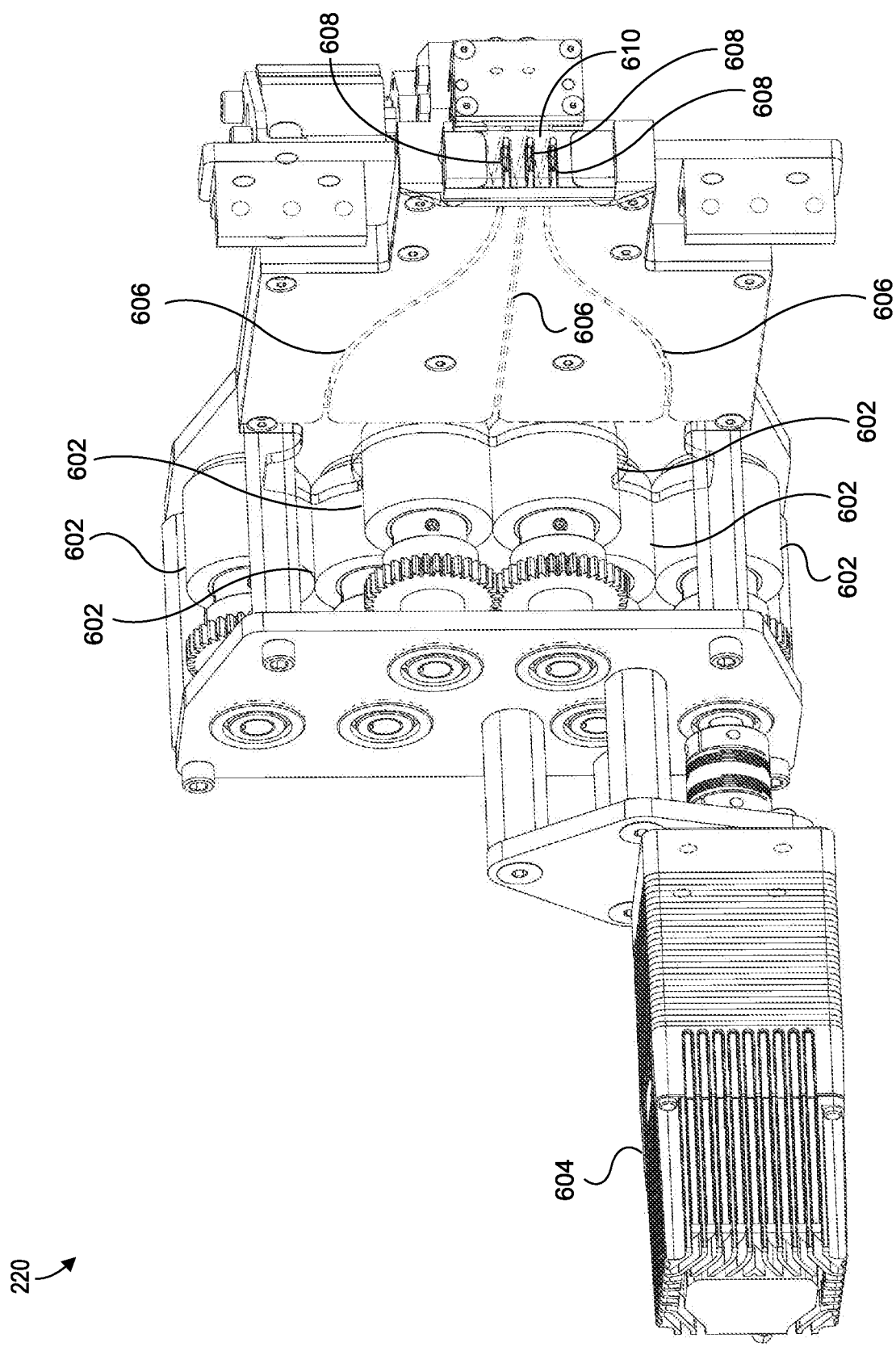
FIG. 6 is a side perspective view of a weft inserter stack of a continuous composite weaving machine in accordance with an example embodiment.

FIG. 6 shows an embodiment of a weft inserter stack 220 having three inertial weft inserters that are configured to simultaneously output up to three separate weft filaments 222. The weft inserter stack 220 shown in FIG. 6 includes three inertial weft inserter roller pairs 602 that are each configured to propel a continuous strand of weft filament from a weft filament source positioned behind weft inserter stack 220 through a channel 606, and out of a slit 608 for insertion into a warp 300 formed by a plurality of warp filaments 212. A continuous strand of weft filament 222 may be dispensed from a weft filament spool or roll (not shown) and fed into one of the inertial weft inserter roller pairs 602. The two rollers of a roller pair 602 that engage a weft filament 222 may simultaneously rotate in opposing directions to pull a portion of the weft filament 222 off of the spool while propelling another portion of the weft filament 222 through channel 606 towards slit 608. The propulsion caused by a roller pair 602 may serve to eject a weft filament 222 of a predetermined length out of a slit 608 of weft inserter stack 220. The rotation of one or more roller pairs 602 may be powered by a motor 604. As shown in FIG. 6, a plurality of roller pairs 602 may be powered by a single motor, such that each of the roller pairs 602 may be selectively activated by engaging gears associated with a roller pair 602 with a gear chain driven by the motor. Controller 260 which may send a signal to the plurality of roller pairs 602 to selectively engage one or more roller pairs 602 to cause weft inserter stack 220 to eject weft filaments 222 in accordance with a weave pattern controller 260 has been programmed to execute. Accordingly, the ejection of weft fibers 222 by weft inserter stack 220 can be timed to work in concert with the motion of roller assembly 116. In some embodiments, each roller pair 602 may be individually powered by a unique motor associated with the roller pair 602.

Although weft filaments 222 fed off of a spool into weft inserter stack 220 may be continuous strands, a cutting apparatus 610 may cut weft filaments 222 such that weft filaments 222 of a discrete length are ejected out of weft inserter stack 220 and inserted into warp 300. Accordingly, in some embodiments, inertial weft inserter roller pairs may be configured to rotate a predetermined amount to eject a predetermined length of weft filament 222. In some embodiments, a sensor positioned on the opposing side of warp 300 may detect the position of the weft filament 222 and the corresponding inertial weft inserter roller pair 602 may cease rotating in response to receiving a signal indicating that the weft filament 222 has been ejected a predetermined distance. In some embodiments, the predetermined distance may represent a minimum distance required for a weft filament 222 to cover the distance between the two end columns of warp filaments 212e, 212h.

As shown in FIG. 6, weft inserter stack 220 may include a plurality of channels 606 for directing weft filaments 222 from the plurality of inertial weft inserter roller pairs 602 to a plurality of slits 608. The channels may be internal to the body of the weft inserter stack 220 such that the weft filaments 222 are constrained to movement along the paths defined by the channels 606. The slits 608 may be apertures at the edge of the weft inserter stack 220 that are positioned at different vertical heights along the front face of the device. In some embodiments, each adjacent slit 608 may be vertically spaced apart by a common offset distance. The positioning of the slits 608 may be configured to position the weft filaments 222 ejected by the weft inserter stack 220 so that each weft filament 222 may be inserted into the warp 300 at a desired vertical height as described in greater detail below with respect to FIGS. 7A through 12B. After one or more weft filaments 222 have been inserted into warp 300, the weft filaments may be cut into discrete lengths by cutting apparatus 610. As shown in FIG. 6, in some embodiments, cutting apparatus may be positioned adjacent to slits 608, internally to the body of weft inserter stack 220. Cutting apparatus 610 may include one or more blades that are configured to be actuated to move within a vertical plane that is approximately perpendicular to the weft filaments 222 positioned at slits 608 in order to cut one or more weft filaments 222. For example, in some embodiments, cutting apparatus may include a plurality of blades configured to move in unison. In some embodiments, the number of the plurality of blades may correspond to the number of slits 608. In some embodiments, cutting apparatus may be a cutting wheel or disc, a laser, or a waterjet.

Although the embodiment shown in FIG. 6 depicts only three weft inserters, it is contemplated that a weft inserter stack 220 having any number of weft inserters may be similarly constructed by adding more inertial weft inserter roller pairs 602, channels 606, and slits 608. Further, although this embodiment uses inertial weft inserter roller pairs 602 to generate the propulsion/ejection force of the weft filaments 222, as discussed above, a weft inserter stack 220 may alternatively be constructed using one or more rapier weft inserters, air-jet inserters, or some combination of thereof.

FIGS. 7A-8B show representations of cutaway views of a continuous composite weaving machine 100, viewed from the perspective of roller assembly 116 looking towards warp rack 110, according example embodiments. As shown in FIG. 7A, continuous composite weaving machine 100 may have a plurality of warp heads 402a, 402b, 402c, 402d, each having a plurality of warp filaments 212 that extend towards roller assembly 116, forming a warp 300 as discussed above with respect to FIG. 3B. In this embodiment, each of the plurality of warp heads 402 supports four warp filaments 212. The continuous composite weaving machine 100 includes a weft inserter stack 220 positioned to the side of the plurality of warp heads 402 and configured to insert weft filaments 222 into the warp 300 (i.e., between two rows of warp filaments 212). Each of the warp heads 402 shown in FIG. 7A may be said to be in a "neutral position," meaning that the warp heads 402 are positioned at a default height. For example, the neutral position may be a position in which the plurality of warp heads 402 are positioned such about the vertical middle of the weft inserter stack 220. For example, when in the neutral position, a warp head 402 may be positioned such that the middle-most weft inserter 702 of weft inserter stack 220 is aligned to insert a middle weft filament 222b between the two middle-most rows of warp filaments 212 of the warp head 402. As shown by FIG. 7A, when all of the warp heads 402 are in the neutral position, the weft inserter stack 220 may insert weft filaments 222 between the warp filaments 212 to create a weave pattern with no interlacing such that the resulting woven composite material 230 would be an alternating 0-90 unidirectional composite.

As shown in FIG. 7A, in some embodiments, weft inserter stack 220 may include a plurality of primary weft inserters 702 and a plurality of secondary weft inserters 704. Primary weft inserters 702 may be positioned vertically in the middle portion of weft inserter stack 220, whereas secondary weft inserters 704 may be positioned in the top and bottom portion of the weft stack 220. In some embodiments, primary weft inserters 702 may be weft inserters that can be used in any vertical configuration of warp heads 402, whereas secondary weft inserters 704 may only be used if one or more warp heads 402 move a sufficient vertical distance such that a weft filament 222 expelled by secondary weft inserter 704 would be positioned between at least one pair of warp filaments 212. Each primary weft inserter 702 and secondary weft inserter 704 may be controlled independently of one another by controller 260 such that weft filaments 222 may be simultaneously inserted into the warp 300 in using any combination of weft inserters 702, 704.

FIGS. 7B and 7C show an example process for creating a woven composite material 230 with interlacing between warp filaments 212 and weft filaments 222. As shown in FIG. 7B, three of the warp heads 402a, 402c, 402d are in the neutral position and one warp head 402b is in a vertically elevated position at the time weft inserter stack 220 inserts a plurality of weft filaments 222 into the warp 300. As shown, warp head 402b is elevated such that secondary weft inserter 704a is in a position to insert a weft filament 222a between the top pair of warp filaments 212 extending out of warp head 402b. It may be said that in this case, warp head 402b has been elevated one "step." When a warp head 402 moves up or down a step it means that the set of weft inserters 702, 704 that the warp head 402 is positioned to receive weft filaments 222 from between a pair of warp filaments 222 changes by one unit. For example, as shown in FIG. 7B, because warp head 402b has gone up one step, it is positioned to receive a weft filament 222a from secondary weft inserter 704a between a pair of warp filaments 212, but it is no longer positioned to receive a weft filament 222d between a pair of warp filaments 212 from primary weft inserter 702c. As shown in FIG. 7C, when warp head 402b returns from a position of being elevated one step back to the neutral position, each warp filament 212 of warp head 402b pushes down on the weft filament 222a, 222b, 222c, 222d beneath it, causing the interlacing weave pattern shown in FIG. 7C. After this weave pattern has been created, roller assembly 116 may pull the portion of the warp filaments 212 containing weft filaments 222a, 222b, 222c, 222d into the first pair of rollers 120 to carry out the process of compressing the filaments into a woven composite material 230, as described previously above.

Continuous composite weaving machine 100 may continuously create a woven composite material 230 as long as roller assembly 116 continues to pull and draw in warp filaments 212 from filament spools 210 via warp rack 110. In addition to continuously creating a woven composite material, continuous composite weaving machine 100 may also dynamically change the weave pattern to create woven composite materials 230 having customizable strength and stiffness properties. The strength of a woven composite material 230 is a function of the fabric geometry, which may be controlled by continuous composite weaving machine 100. For example, high amounts of crimp may reduce in-plane tensile strength and layer-to-layer interlocking may increase delamination strength and impact strength. Stiffness is a function of fabric geometry and weave density, which may also be controlled by continuous composite weaving machine 100. For example, dense weaves may be stiffer than less dense weaves. Plain weaves may have higher in-plane shear modulus, while satin weaves have higher in-plane tensile modulus, and twill weaves are somewhere in-between.

Continuous composite weaving machine 100 can generate a woven composite material 230 having different properties throughout the material by dynamically changing the fabric geometry and/or weave density of portions of the woven composite 230. For example, FIGS. 8A and 8B show an example process for creating an alternative weave pattern to that shown in FIGS. 7B and 7C. As shown in FIG. 8A, each warp head 402a, 402b, 402c, 402d may be positioned at a different step at the time weft inserter stack 220 inserts weft filaments 222 into the warp 300. In this example, a first warp head 402a is positioned in a neutral position, a second warp head 402b is positioned up one step, a third warp head 402c is positioned up two steps, and a fourth warp head 402d is positioned up three steps. Accordingly, warp filament 212 pairs of the first warp head 402a are positioned to receive weft filaments 222d, 222e, 222f from the three primary weft inserters 702, and warp filament 212 of the fourth warp head 402d are positioned to receive weft filaments 222a, 222b, 222c from the three secondary weft inserters 704, with the warp filament 212 pairs of the second and third warp heads 402b, 402c receiving weft filaments 222 from a combination of primary and secondary weft inserters 702, 704 as shown in FIG. 8A. After the weft inserter stack 220 inserts weft filaments 222a, 222b, 222c, 222d, 222e, 222f into the warp 300, the elevated warp heads 402b, 402c, 402d return to the neutral position, pushing the weft filaments 222a, 222b, 222c, 222d, 222e, 222f downwards to create the interlacing pattern as shown in FIG. 8B. In this example, three weft filaments 222d, 222e, 222f converge at the bottom of warp head 402d, which may create a localized region with improved in-plane strength and stiffness, but may have worse impact strength and shear strength and stiffness. Weave patterns formed where one or more warp heads 402 move up a plurality of steps and one or two warp heads 402 remain in a neutral position at the time of weft insertion may result in woven composite structures with enhanced impact strength due to layer-to-layer interlacing.

It should be appreciated that the weave patterns illustrated by FIGS. 7a-8B may be sequentially integrated into a single piece of woven composite material 230. It should be further appreciated that the particular weave patterns illustrated by FIGS. 7A-8B are merely illustrative and any number or variety of different weave patterns may be achieved and integrated into a composite material 230 in any sequence by changing the vertical positions of the plurality of warp heads 402 between subsequent insertions of one or more weft filaments 222. The number of possible weave patterns may further be expanded by adding more warp filaments 212, warp heads 212, and/or weft inserters 702, 704 to machine 100.

For ease of explaining the concepts disclosed herein, FIGS. 7A-8B illustrate example embodiments of a continuous composite weaving machine 100 having four warp heads 402, however continuous composite weaving machine 100 is not so limited and may include any number of warp heads 402. For example, continuous composite weaving machine 100 may have ten or more warp heads 402.

FIG. 9A is a representative side view of a continuous composite weaving machine 900 having an alternative warp rack comprising a plurality of heddle assemblies 902, according to an example embodiment. In contrast to warp head 402, which can vertically adjust the collective positions of a plurality of warp filaments 212 associated the warp head 402, heddle assembly 902 includes a plurality of heddles 904 that that enable each individual warp filament 212 associated with heddle assembly 902 to be individually vertically adjusted by one of the heddles 904 of heddle assembly 902. Each heddle assembly 902 includes a plurality of heddles 904a, 904b, 904c, 904d. Each of the plurality of heddles 904 has an eye 910 for engaging a warp filament 212 that may be vertically adjusted by the heddle 904 and a slot 912 for allowing other warp filaments 212 that may not be vertically adjusted by the heddle 904 to pass through. The warp filament 212 that a given heddle 904 is configured to individually control may pass through the eye 910 of the heddle 904, whereas each warp filament 212 to be controlled by a different heddle 904 of the heddle assembly 902 may either pass through a slot 912 of the heddle 904 or may pass underneath the bottom of the heddle 904 as shown in FIGS. 9A and 9B. Each heddle 904 is capable of independent vertical movement, similar to the movement described above with respect to warp heads 402 of FIGS. 4A and 4B. When a particular heddle 904 moves, the height of the portion of the warp filament 212 held by the eye 910 will be adjusted to follow the movement of the heddle 904.

Similar to the warp heads 402 shown in FIGS. 4A and 4B, the plurality of heddle assemblies 902 are aligned adjacent to one another in a first vertical plane. As shown in FIG. 9A, individual heddles 904 of a heddle assembly 902 may be aligned adjacent to one another in a second vertical plane that is approximately perpendicular to the first vertical plane. For example, as shown in FIG. 9A, a first heddle 904a is adjacent to a second heddle 904b, which is further adjacent to a third heddle 904c, which is further adjacent to a fourth heddle 904d. Accordingly, the plurality of heddles 904 of a heddle assembly 902 may be positioned back-to-back as shown in FIG. 9A. Each of the plurality of heddle assemblies 902 may be actuated in a manner similar to warp heads 402, such as for example, driving a lead screw with a motor, a solenoid, a pneumatic or hydraulic actuator, or any other such method of providing vertical movement. Also similar to warp heads 402, the vertical movement of each heddle may be constrained by base plate 121 and top plate 122, limit switches, beam-based sensors, or encoders on the motors that drive the motion of the heddle assemblies.

FIG. 9B shows an exploded view of a heddle assembly 902'. As shown in the exploded heddle assembly 902', a first heddle 910a has an eye 910 for receiving a first warp filament 212a that may be individually vertically controlled by first heddle 910a. Exploded heddle assembly 902' further shows that a second heddle 910b has an eye 910 for receiving a second warp filament 212b that may be individually vertically controlled by second heddle 910b and a slot 912 for receiving the first warp filament 212a. A third heddle 910c of heddle assembly 902 has an eye 910 for receiving a third warp filament 212c that may be individually vertically controlled by third heddle 910c, and a slot 912 for receiving the first warp filament 212a and the second warp filament 212b. A fourth heddle 904d of heddle assembly 902 has an eye 910 for receiving a fourth warp filament 212d that may be individually vertically controlled by fourth heddle 910d, and a slot 912 for receiving the first warp filament 212a, the second warp filament 212b, and the third warp filament 212c. FIG. 9C shows a front view of heddle assembly 902" in which each heddle 904a, 904b, 904c, 904d is positioned in a back-to-back configuration as shown in FIG. 9A. When aligned in a back-to-back configuration the first warp filament 212a may pass through the slots 912 of the fourth, third, and second heddles 904d, 904c, 904b before passing through the eye 910 of the first heddle 904a and then extending towards roller assembly 116. Similarly, the second warp filament 212a may pass through the slots 912 of the fourth and third heddles 904d, 904c before passing through the eye 910 of the second heddle 904d and then extending towards roller assembly 116 beneath first heddle 904a. The third warp filament 212c may pass through the slot 912 of the fourth heddle 904d before passing through the eye 910 of the third heddle 904c and then extending towards roller assembly 116 beneath first and second heddles 904a, 904b. Further, the fourth warp filament 212d may only pass through the eye 910 of the fourth heddle 904d and then extending towards roller assembly 116 beneath first, second, and third heddles 904a, 904b, 904c. Accordingly, first warp filament 212a is individually vertically controllable by first heddle 904a, second warp filament 212b is individually vertically controllable by second heddle 904b, third warp filament 212c is individually vertically controllable by third heddle 904c, and fourth warp filament 212d is individually vertically controllable by fourth heddle 904d. As can be seen in FIG. 9A, because some warp filaments 212b, 212c, 212d may be positioned beneath some heddles 904a, 904b, 904c (e.g., warp filament 212d runs below heddles 904a, 904b, 904c before entering roller assembly 116), the extent to which a given heddle 904 may move vertically downwards may be limited based on the positions of the heddles 904 adjacent to it to prevent the bottom of a heddle 904 from coming into contact with a warp filament 212 beneath it, unless the adjacent heddles move as well. For example, for the second heddle 904b shown in FIG. 9A to move down two steps, the third and fourth heddles 904c, 904d would also have to move down at least two steps to accommodate the second heddle's 904b movement. In some embodiments, heddles 904 may be configured to only move in a downwards direction from the neutral position, but may be configured to move in an upwards direction in order to return to a neutral position or a position that is one or more steps below the neutral position. A neutral position may be considered to be a position in which the plurality of heddles 904 are positioned such that each eye 910 of a heddle is positioned one step below the eye 910 of the heddle in front of it, as shown in FIGS. 9A and 9C. According to some embodiments, heater elements may be included in heddle assembly 902, but other heating elements (e.g., infrared or microwave heating elements) may be placed in the area between the plurality of heddle assemblies 902 and the first pair of rollers 120 to heat the filaments above the glass transition temperature of the matrix polymer.

FIG. 10-12B show a representative cutaway views of a continuous composite weaving machine 900, viewed from the perspective of roller assembly 116 looking towards warp rack 110, according to example embodiments. As shown in FIG. 10, continuous composite weaving machine 900 may include a weft stack inserter 220 similar to that previously described above with respect to FIG. 6 and a plurality of heddle assemblies 902a, 902b, 902c, 902d, as described above with respect to FIGS. 9A-9C. FIG. 10 shows a configuration in which each heddle assembly 902a, 902b, 902c, 902d is in a neutral position such that warp filaments extending out of each eye 910 of the plurality of heddle assemblies 902a, 902b, 902c, 902d form a warp positioned to receive weft filaments 222 without interlacing, similar to the embodiment shown in FIG. 6.

Figures 12A, 12B:
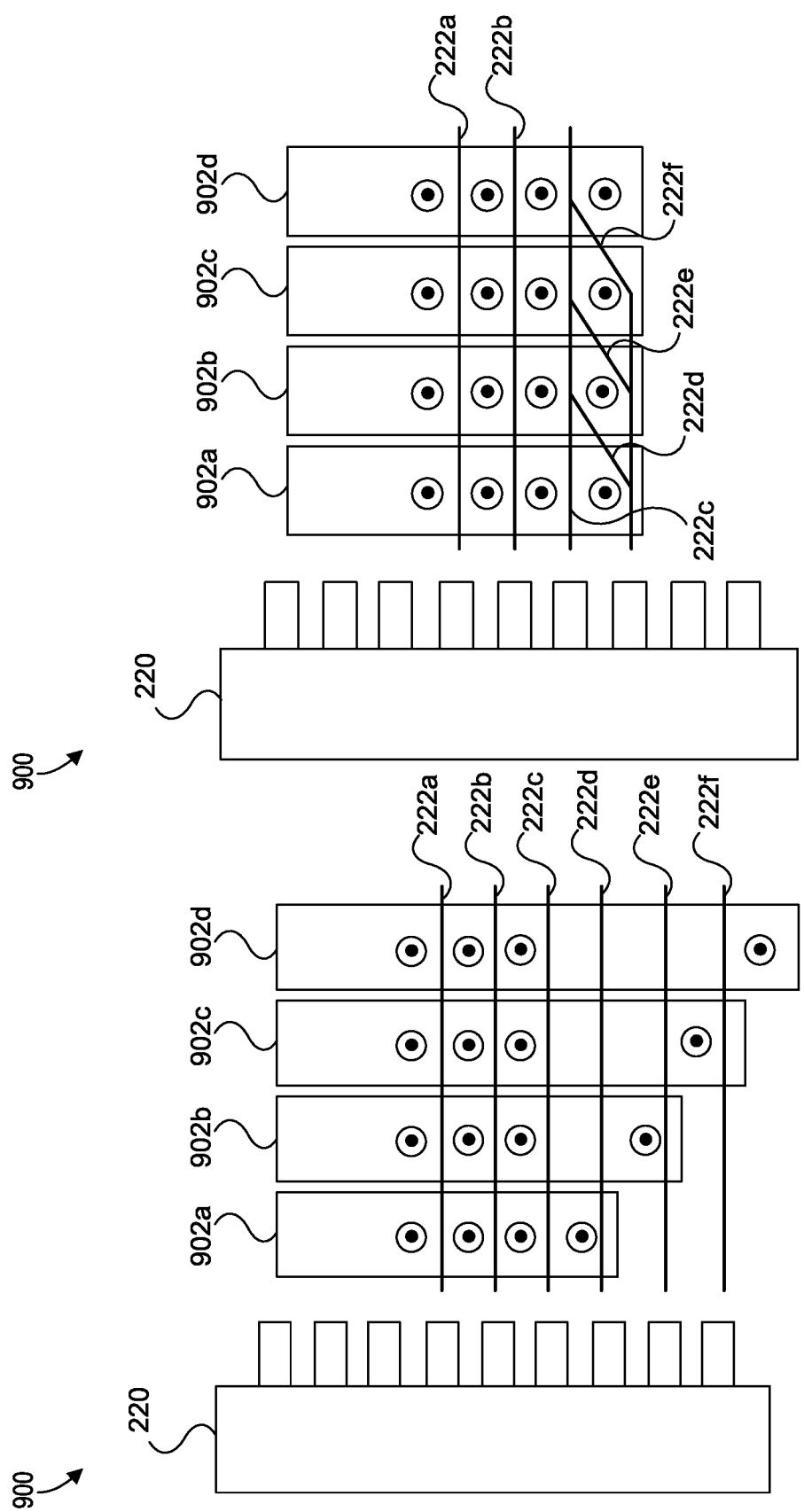
FIGS. 12A and 12B are representative front cutaway views of a continuous composite weaving machine having a warp head configuration comprising an assembly of heddles, showing another example of filament interlacing that occurs as heddles move from a first vertical configuration (FIG. 12A) to a second vertical configuration (FIG. 12B) in accordance with an example embodiment.

FIGS. 11A-11B illustrate the process of forming an interlaced weave pattern by a continuous composite weaving machine 900. As shown in FIG. 11A, three of the heddle assemblies 902a, 902c, 902d of a continuous composite weaving machine 900 are in a neutral position, but one heddle assembly 902b is in a position that is down one "step." When referring to heddle assemblies 902, a "step" may refer to the downward movement of the heddle assembly 902 such that the eye 910 of the heddle 904 forces the warp filament 212 contained within the eye 910 below the next weft inserter 702, 704 of the adjacent weft inserter stack 220. For example, one step down may indicate that the eye 910 of a heddle 904 has moved vertically beyond the plane in which the next weft inserter 704 is configured to insert a weft filament 222. As shown in FIG. 11A, the second heddle assembly's 902b fourth heddle 904d has moved down one step prior to the insertion of a plurality of weft filaments 222a, 222b, 222c, 222d by weft inserter stack 220. Note that because the top three warp filaments 212a, 212b, 212c pass through the slot 912 of the fourth heddle 904d, their vertical positions are left unchanged by the movement of the fourth heddle 904d, which only affects the vertical position of the warp filament 212d engaged by the eye 910 of the fourth heddle 904d. After the weft filaments 222 have been inserted into the warp, the fourth heddle 904d of the second heddle assembly moves up a step, returning to the neutral position, forming an interlacing weave as shown in FIG. 11B. FIGS. 12A-12B show another embodiment of an interlacing weave pattern formed by a continuous composite weaving machine 900. As shown in FIG. 12A, a first heddle assembly 902a is in a neutral position, the fourth heddle 904d of the second heddle assembly 902b is down one step, the fourth heddle 904d of the third heddle assembly 902c is down two steps, and the fourth heddle 904d of the fourth heddle assembly 902d is down three steps at the time of insertion of the plurality of weft filaments 222a, 222b, 222c, 222d, 222e, 222f by the weft inserter stack 220. Following the retraction the fourth heddles 904d of the second, third, and fourth heddle assemblies 902b, 902c, 902d back to the neutral position, an interlacing pattern as shown in FIG. 12B is formed. Although the figures only show examples in which the fourth heddle 904d of the heddle assemblies 902 moves down one or more steps, it should be understood that the first, second, and third heddles 904a, 904b, 904c of a heddle assembly 902 may all independently move vertically down to dynamically create a variety of intricate interlacing weave patterns as the warp is continuously drawn forward and compressed by roller assembly 116. For example, if the fourth heddle 904d of a heddle assembly 902 is down three steps, then the third heddle 904c may move down one, two, or three steps. In other words, if a particular heddle 904 of a heddle assembly 902 moves down a number of steps, then the adjacent heddle 904 in positioned in front of the particular heddle 904 may be enabled to move down the same number of steps or less.

Figure 13:
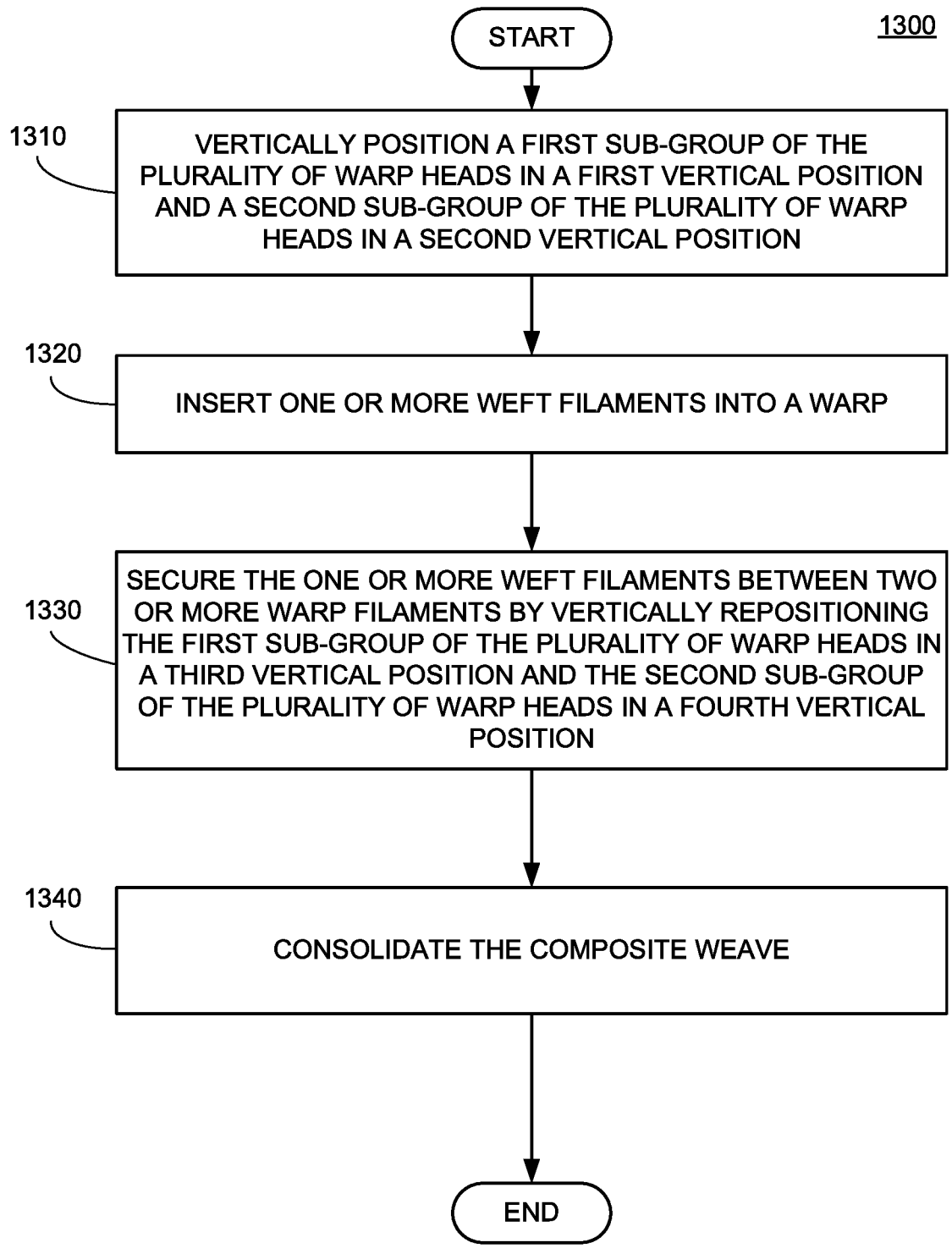
FIG. 13 is a flowchart of a method for continuously forming a composite weave in accordance with an example embodiment.

FIG. 13 shows a flowchart of a method 1300 for continuously forming a woven composite material using a continuous composite weaving machine 100. Continuous composite weaving machine 100 may have a plurality of warp filaments suspended between a roller assembly 116 and a warp rack 110 that comprises a plurality of warp heads 402. Each warp head 402 may comprise a plurality of filament channels 502 positioned at different vertical locations along the height of the warp head 402 (as shown in FIG. 5A). Each filament channel 502 may be configured to engage a warp filament 212, and each warp head 402 may be capable of independent vertical movement to adjust the height of warp filaments 212 associated with the respective warp head 402 relative to the roller assembly 116.

At block 1310, the method may include vertically positioning a first sub-group of the plurality of warp heads 402 in a first vertical position and a second sub-group of the plurality of warp heads 402 in a second vertical position such that the vertical height of each warp filament 212 in a filament channel 502 of a warp head 402 of the first sub-group of the plurality of warp heads 402 is higher than a warp filament 212 in a corresponding filament channel 502 of a warp head 402 of the second sub-group of the plurality of warp heads 402.

At block 1320, the method may include inserting (e.g., by weft inserter stack 220) one or more weft filaments 222 into a warp 300 that is positioned between the roller assembly 116 and the warp rack 110, such that each weft filament 222 is inserted between a warp filament 212 associated with the first sub-group of the plurality of warp heads 402 and a warp filament 212 associated with the second sub-group of the plurality of warp heads 402. A weft filament 222 may be inserted into the warp 300 such that a plurality of warp filaments 212 associated with the first sub-group of the plurality of warp heads 402 are positioned above the weft filament 222 and a plurality of warp filaments 212 associated with the second sub-group of the plurality of warp heads 402 are positioned below the weft filament 222. Weft inserter stack 220 may simultaneously insert multiple weft filaments 222 at different heights of the warp 300. Each weft filament 222 that is simultaneously inserted into warp 300 may have a different sub-group of warp filaments 212 positioned above the weft filament 222 and a different sup-group positioned below the weft filament 222. In this manner, based on the vertical positions of the plurality of warp heads 402 and the number and vertical positions of the inserted weft filaments 222, continuous composite weaving machine 100 may place weft filaments 222 into the warp 300 so that a customized predetermined internal geometry of the weave may be achieved.

At block 1330, the method may include securing the one or more weft filaments 222 between two or more warp filaments 212 to form a composite weave by vertically repositioning the first sub-group of plurality of the warp heads 402 in a third vertical position and the second sub-group of the plurality of warp heads 402 in a fourth vertical position such that the vertical height of each warp filament 212 in a filament channel 502 of a warp head 402 of the first sub-group of the plurality of warp heads 402 is lower than a warp filament 212 in the corresponding filament channel 502 of a warp head 402 of the second sub-group of the plurality of warp heads 402. Alternatively, in some embodiments, the third and fourth vertical positions may be the same vertical height, such that the warp heads 402 associated with the first and second sub-groups of warp filaments 212 return to, for example, a neutral position. In a neutral position, the filament channels 502 of each of the warp heads 402 may be vertically aligned such that they form rows.

At block 1340, the method may include consolidating the composite weave by activating the roller assembly 116 to draw the composite weave through a pair of opposing rollers (e.g., the first pair or rollers 120) that are configured to heat and compress the composite weave. Continuous composite weaving machine 100 may continually form a composite weave by repeating blocks 1310, 1320, 1330, and 1340 in sequence. The vertical positions of the sub-groups of warp heads 402 may change during each iteration of this ongoing process in order to create a composite weave of a specified internal geometry. For example, controller 260 may contain instructions that specify a particular sequence of movements of warp heads 402 along with a particular sequence of weft filament 222 insertions to create a woven composite material 230 that has a specified internal geometry that may utilize interlacing. In some embodiments, roller assembly 116 may be activated for short bursts following each subsequent insertion of one or more weft filaments 222 into the warp 300 to consolidate the portion of the composite weave that includes the newly inserted weft filaments 222. In some embodiments, warp heads 402 may return to a neutral position after an insertion of one or more weft filaments 222 is performed and prior to the activation of roller assembly 116.

In some embodiments, method 1300 may optionally include a step of creating the warp 300 between the roller assembly 116 and the warp rack 110 by feeding a free end of each of a plurality of warp filaments 212 originating from a plurality of filament spools 210 through a unique filament channel 502 of one of a plurality of warp heads 402 of the warp rack 110 and then further feeding the free end of each of the plurality of warp filaments 212 through a pair of opposing rollers of roller assembly 116 (e.g., first pair of rollers 120).

Although method 1300 is described with respect to a continuous composite weaving machine 100 that utilizes a warp rack 110 having a plurality of warp heads 402, a similar method may also be carried out for a continuous composite weaving machine 900 that utilizes a plurality of heddle assemblies 902 and having a configuration as described above with respect to FIGS. 9A-9C. For example, heddles 904 of a first sub-group of the plurality of heddle assemblies 902 may be vertically positioned in a first vertical configuration and a second sub-group of the heddles 904 of a second sub-group of the plurality of heddle assemblies 902 may be positioned in a second vertical configuration to form a warp 300. Weft inserter stack 220 may insert one or more weft filaments 222 into the warp 300 at different vertical heights such that each inserted weft filament 222 has a different sub-set of warp filaments 212 positioned above and below it. Some or all of the heddles 904 of the first and second sub-groups of the plurality of heddle assemblies 902 may change to a different vertical configuration to secure the one or more weft filaments 222 within the weave. For example, all of the heddles 904 may return to a neutral position. After the one or more weft filaments 222 are secured within the weave, a pair or rollers (e.g. the first pair or rollers 120) may be activated to draw in the portion of the weave containing the one or more weft filaments 222 and roller assembly 116 may consolidate the composite weave 230 as described above. This process may be repeated by continuous composite weaving machine 900 to continuously form a composite weave having a controllable internal geometry.

According to some embodiments, after a woven composite material 230 has been formed by continuous composite weaving machine 100, the woven composite material 230 may then be preformed, trimmed, and/or shaped into three dimensional structures using traditional injection molding or long fiber thermoplastic molding. For example, after exiting roller assembly 116, woven composite material 230 may be trimmed using, for example, a water jet, a laser, a shear press, or any other suitable device of method of trimming. Accordingly, in some embodiments, a composite weaving machine 100 may include a trimming device configured to trim the woven composite material 230 after it exits roller assembly 116. A trimming device may be, for example, a computer numerical control (CNC) waterjet.

The trimmed composite may then be heated and stamped/pressed into a preform shape. For example, in some embodiments, a composite weaving machine 100 may include a stamping press that may press the trimmed composite into a preformed shape. In some embodiments, composite weaving machine 100 may include a robot arm to pick up the trimmed composite and place it in the stamping press. Heating can be performed using, for example, an oven, induction heating, or any other suitable heating method. The preform may then be placed in a compression mold or injection mold and over-molded (e.g., injection, DLFT, LFT, etc.). In some embodiments, composite weaving machine 100 may include an injection molding machine for injection molding or over-molding the preform. In some embodiments, composite weaving machine 100 may include a robot arm that is configured to pick up the preformed shape from the stamping press and place it in the injection molding machine. The process of over-molding may allow for texturizing of the preform and the creation of non-structural protruding features. The preform may be over-molded multiple times to add different materials to the preform or add materials to different sides or portions of the preform. Following the over-molding process, the part may be removed from the mold and trimmed and finished. For example, the part may have edges trimmed, holes drilled into it, it may be sanded down, or any other such typical finishing process may be applied to the part. In some embodiments, composite weaving machine 100 may include a robot arm configured to pick up the overmolded preform and place it in a device that is configured to trim and finish the part. A variety of shapes may be formed using this process, including, for example but not limited to, brackets and panels (such as vehicle body panels) with flat or curvilinear contour.

For example, a two-piece car door could be formed by preforming the woven composite into the shape of the outer surface of the door panel. In this example, a first piece may be creating by a first over-molding shot that may allow the formation of a smooth airflow surface and a second over-molding shot that forms the internal surface of the door (e.g., forming channels for wiring, window, handle, etc.). Once the internal components of the door (e.g., wiring, window, handle, etc.) are installed into the channels of the first piece, a second piece may be joined to the first piece to encase the internal components. The second piece may also contain a woven preform, if needed for structural stiffness. Although the prior example illustrates a particular industrial application of a preform created from a woven composite material 230 fabricated by a continuous composite weaving machine 100, those of skill in the art will appreciate that such preforms may have a variety of different industrial applications.

In some embodiments, the process of trimming, stamping, injection molding/overmolding, and trimming and finishing of a woven composite material 230 described above could be performed continuously by using die stamping for the preliminary trimming, performing, and overmolding. The die stamping may be run off of a continuous stock during the press operation. Following this process, final trimming may be performed as described above. In some embodiments, the continuous composite weaving machine 100 may not have a cooled rollers (e.g., the second pair of rollers 130 may be omitted) because the composite may need to remain above $T_m$ before the preforming step.

Figure 14:
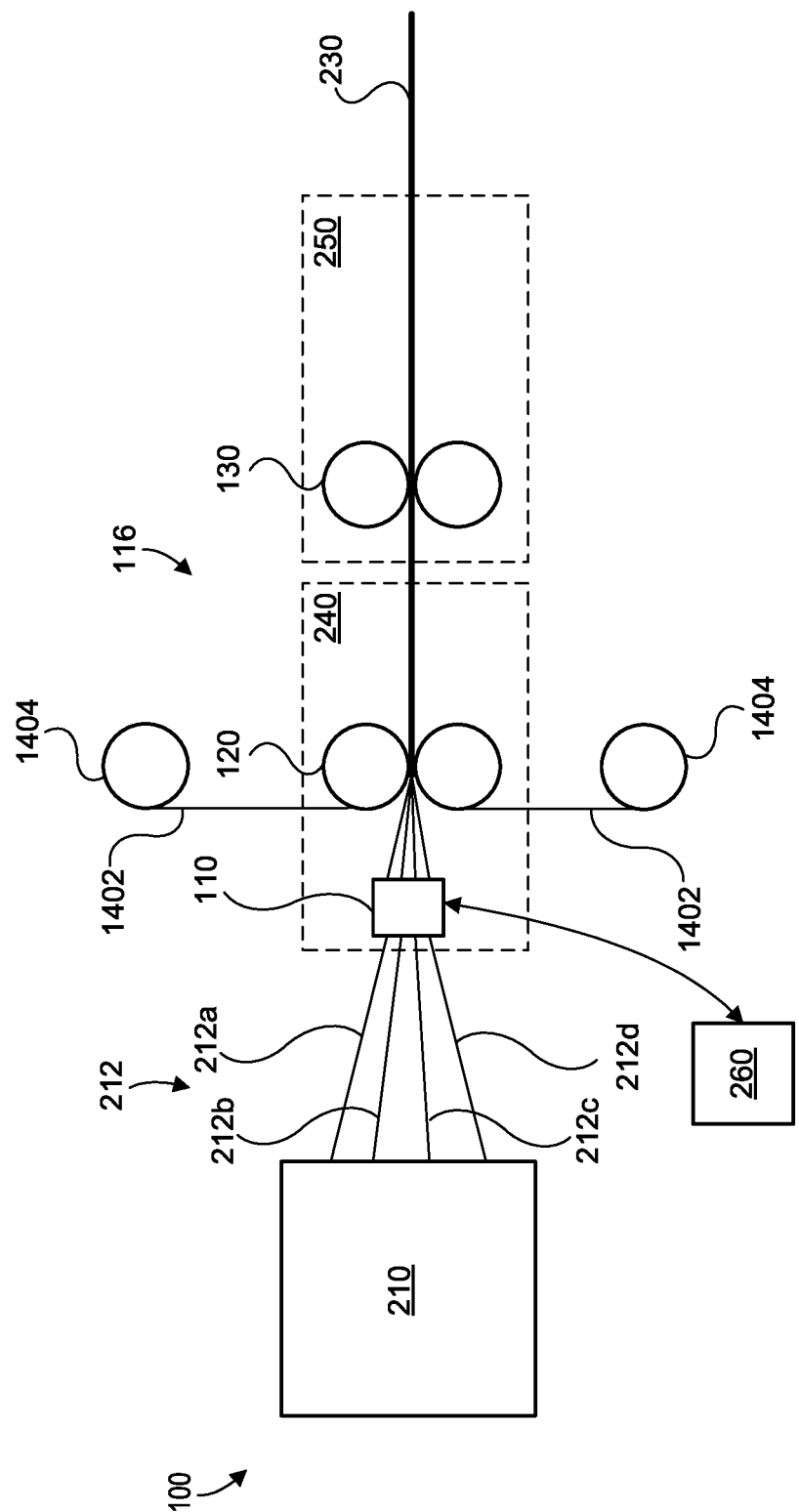
FIG. 14 is a representative side view of another continuous composite weaving machine in accordance with an example embodiment.

FIG. 14 shows a representative side view of an embodiment of a continuous composite weaving machine 100 that is configured to apply a polymer film 1402 to the top and/or bottom surface of the composite weave before it enters roller assembly 116. Polymer film 1402 may be a pure polymer film, a polymer-infused fiber mat, or a combination of the two. Rolls of polymer film 1402 on polymer film rollers 1404 can be positioned above and/or below the first pair of rollers 120. Roller assembly 116 (e.g., via the first pair of rollers 120) may draw polymer film 1402 off of polymer film rollers 1404 in a manner similar to how roller assembly draws warp filaments 212 from filament spools 210, as described above. Polymer film 1402 may laminate the top and/or bottom surface of the composite weave as it is consolidated by roller assembly 116. After being consolidated by roller assembly 116, the consolidation process may result in a consolidated woven composite material 230 that is a finished flat panel that can be used as-is or used in the overmolding process described above.

The design and functionality described in this application is intended to be exemplary in nature and is not intended to limit the instant disclosure in any way. Those having ordinary skill in the art will appreciate that the teachings of the disclosure may be implemented in a variety of suitable forms, including those forms disclosed herein and additional forms known to those having ordinary skill in the art. For example, one skilled in the art will recognize that executable instructions may be stored on a non-transient, computer-readable storage medium, such that when executed by one or more processors, causes the one or more processors to implement the method described above.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A machine for continuously forming a finished woven composite from a composite weave material comprising:
    a warp rack comprising warp heads for receiving one or more polymer impregnated or coated warp filaments;
    a weft inserter stack comprising weft inserters for inserting one or more polymer impregnated or coated weft filaments between one or more warp filaments to form the composite weave material; and
    a consolidation zone for heating and compressing the composite weave material to form the finished woven composite; wherein each warp head is capable of independent vertical movement to adjust the height of a warp filament extending from the warp head toward a roller assembly.

2. The machine of claim 1 further comprising:
    one or more spools for dispensing the one or more polymer impregnated or coated warp filaments; and
    a roller assembly in the consolidation zone configured to receive the composite weave material;
    wherein each warp head comprises filament channels, one each positioned at different vertical locations along the height of the warp head;

wherein each filament channel is configured to engage the warp filament suspended between one of the spools and the roller assembly; and wherein the warp heads are aligned adjacent to one another in a vertical plane.

3. The machine of claim 2, wherein each of the warp filaments and weft filaments comprises a polymer impregnated or coated filament.

4. A machine for continuously forming a finished woven composite from a composite weave material comprising:
spools for dispensing polymer impregnated or coated warp filaments;
a warp rack comprising warp heads for receiving warp filaments from the spools, each warp head:
comprising filament channels positioned at different vertical locations along the height of the warp head, each filament channel configured to engage a warp filament suspended between one of the spools and a roller assembly; and being capable of vertical movement independent of vertical movement of the other of the warp heads to adjust the height of warp filaments extending from the warp head toward the roller assembly;
a weft inserter stack comprising weft inserters for inserting polymer impregnated or coated weft filaments between warp filaments to form the composite weave material; and
a consolidation zone with the roller assembly configured to receive the composite weave material and consolidate the composite weave material by heat and pressure to form the finished woven composite.

5. The machine of claim 4, wherein the roller assembly comprises a pair of heated rollers for heating the warp filaments and the weft filaments of the composite weave material to meld them together.

6. The machine of claim 5, wherein the roller assembly further comprises a pair of cooled rollers downstream of the pair of heated rollers for cooling the composite weave.

7. The machine of claim 4, wherein the warp heads are aligned adjacent to one another in a vertical plane.

8. The machine of claim 4, wherein the finished woven composite is a multilayer composite panel continuously formed from the spooled filaments through to the finished woven composite by the machine itself.

9. The machine of claim 4 further comprising a controller configured to control a sequence of vertical movements of one or more warp heads and insertions of one or more of the weft filaments between one or more of the warp filaments to create a composite weave having a predetermined pattern.

10. The machine of claim 4, wherein the weft inserters of the weft inserter stack are configured to insert one or more of the weft filaments between one or more of the warp filaments such that each inserted weft filament is oriented approximately perpendicularly to the one or more warp filaments.

11. The machine of claim 4, wherein the composite weave material is an interlacing weave material formed of at least two layers interlaced with at least one weft filament;
wherein the weft inserter stack is configured to simultaneously insert a first weft filament of the weft filaments at a first height between a first layer of a pair of warp filaments of the warp filaments and a second weft filament of the weft filaments at a second height different than the first height between a second layer of a pair of warp filaments of the warp filaments.

12. The machine of claim 4, wherein one or more weft inserters are selected from the group consisting of a rapier weft inserter, an air-jet weft inserter, and an inertial weft inserter.

13. A machine for continuously forming a consolidated composite weave comprising:
one or more spools for dispensing one or more warp filaments;
a roller assembly configured to;
receive a composite weave material comprising one or more of the warp filaments and one or more weft filaments; and
consolidate the composite weave material into the consolidated composite weave;
a warp rack comprising heddle assemblies for receiving one or more of the warp filaments from the one or more spools, each heddle assembly comprising:
a first heddle comprising a first eye for engaging a first warp filament suspended between a spool of the one or more spools and the roller assembly, the first heddle capable of vertical movement independent of vertical movement of other heddle assemblies to adjust the height of the first eye; and
a second heddle having a slot for receiving the first warp filament and a second eye for engaging a second warp filament suspended between a spool of the one or more spools and the roller assembly, the second heddle capable of vertical movement independent of vertical movement of other heddle assemblies to adjust the height of the second eye;
a weft inserter stack comprising weft inserters for inserting one or more of the weft filaments between one or more of the warp filaments;
wherein the consolidated composite weave is continuously formed from polymer impregnated or coated warp filaments of the composite weave material by compressing and heating of the composite weave material; and
wherein the heddle assemblies are aligned adjacent to one another in a first vertical plane.

14. The machine of claim 13, wherein the first heddle of each heddle assembly is positioned adjacent to the second heddle of the respective heddle assembly in a second vertical plane that is approximately perpendicular to the first vertical plane.

15. The machine of claim 13, wherein the first eye of the first heddle of a heddle assembly aligns with the slot of the second heddle of the heddle assembly when the heddle assembly is in a neutral position.

16. The machine of claim 13, wherein each heddle assembly further comprises a third heddle having a slot for receiving the first warp filament and the second warp filament, and a third eye for engaging a third warp filament suspended between a spool of the one or more spools and the roller assembly, the third heddle being capable of independent vertical movement to adjust the height of the third eye.

17. The machine of claim 16 further comprising a controller configured to control a sequence of vertical movements of one or more of the first, second, and/or third heddles and insertions of one or more of the weft filaments between one or more of the warp filaments to create the consolidated composite weave having a predetermined pattern.

18. A method of continuously forming a consolidated woven composite using a machine having a plurality of polymer impregnated or coated warp filaments suspended between a roller assembly and a warp rack that comprises a plurality of warp heads, wherein each warp head comprises a plurality of filament channels positioned at different vertical locations along the height of the warp head, each filament channel configured to engage a warp filament, and each warp head being capable of independent vertical movement to adjust the height of warp filaments associated with the respective warp head relative to the roller assembly, the method comprising:

vertically positioning a first sub-group of the plurality of warp heads in a first vertical position and a second sub-group of the plurality of warp heads in a second vertical position such that the vertical height of each warp filament in a filament channel of a warp head of the first sub- group of the plurality of warp heads is higher than a warp filament in a corresponding filament channel of a warp head of the second sub-group of the plurality of warp heads;

inserting one or more polymer impregnated or coated weft filaments into a warp between the roller assembly and the warp rack, such that each weft filament is inserted between a warp filament associated with the first sub-group of the plurality of warp heads and a warp filament associated with the second sub-group of the plurality of warp heads;

securing the one or more weft filaments between two or more warp filaments to form a composite weave by vertically repositioning the first sub-group of plurality of the warp heads in a third vertical position and the second sub-group of the plurality of warp heads in a fourth vertical position such that the vertical height of each warp filament in a filament channel of a warp head of the first sub-group of the plurality of warp heads is lower than a warp filament in the corresponding filament channel of a warp head of the second sub-group of the plurality of warp heads; and consolidating the composite weave into the consolidated woven composite compressing and heating the composite weave.

19. The method of claim 18 further comprising creating the warp between the roller assembly and the warp rack by:
feeding a free end of each of a plurality of warp filaments originating from a plurality of filament spools through a unique filament channel of one of a plurality of warp heads of the warp rack; and feeding the free end of each of the plurality of warp filaments through a pair of opposing rollers.

20. The method of claim 18, wherein consolidating the composite weave comprises activating the roller assembly to draw the composite weave through a pair of opposing rollers that are configured to heat and compress the composite weave.

21. The method of claim 18, wherein consolidating the composite weave comprises:
heating the composite weave in a heated zone configured to meld together one or more warp filaments and one or more weft filaments of the composite weave; and
compressing the composite weave.

22. The method of claim 21, wherein the heating and the compressing comprises an ultrasonic welding bar that, for heating, vibrates the composite weave to generate heat by elastic losses and, for compressing, compresses the composite weave against an anvil.

23. The method of claim 21, wherein the heating zone comprises a heating device selected from the group consisting of an inductive heater, a convection device, and a microwave heating device;
wherein the inductive heater induces current in the composite weave by generating an alternative or rotating magnetic field to generate heat through resistive losses; and
wherein the convection device circulates hot air around the composite weave.

24. The method of claim 21, wherein compressing the composite weave comprises compressing the composite weave by drawing the composite weave through a first pair of opposing rollers of the roller assembly.

25. The method of claim 24 further comprising tensioning the consolidated woven composite as it cools by drawing the consolidated woven composite through a second pair of opposing rollers after compressing the composite weave through the first pair of opposing rollers.

\* \* \* \* \*